(12) United States Patent
Smith et al.

(10) Patent No.: US 10,426,102 B2
(45) Date of Patent: Oct. 1, 2019

(54) MODULAR GREENHOUSE WITH A METHOD

(71) Applicants: Joshua C. Smith, Reno, NV (US); Michael J. Botich, Fernley, NV (US)

(72) Inventors: Joshua C. Smith, Reno, NV (US); Michael J. Botich, Fernley, NV (US)

(73) Assignee: SOLAI, INC., Reno, NV (US)

(*) Notice: Subject to any disclaimer, the term of this patent is extended or adjusted under 35 U.S.C. 154(b) by 125 days.

(21) Appl. No.: 15/187,741

(22) Filed: Jun. 20, 2016

(65) Prior Publication Data
US 2016/0366837 A1    Dec. 22, 2016

Related U.S. Application Data

(60) Provisional application No. 62/182,419, filed on Jun. 19, 2015.

(51) Int. Cl.
*A01G 9/16*    (2006.01)

(52) U.S. Cl.
CPC .............. *A01G 9/16* (2013.01); *Y02A 40/254* (2018.01)

(58) Field of Classification Search
CPC ........................................................ A01G 9/16
USPC ............................................................. 47/17
See application file for complete search history.

(56) References Cited

U.S. PATENT DOCUMENTS

| | | | | |
|---|---|---|---|---|
| 3,461,916 A * | 8/1969 | Ledgerwood, Jr. | ...... | E21B 17/01 138/120 |
| 3,987,597 A * | 10/1976 | Smrt | ........................ | A01G 9/16 52/764 |
| 4,170,852 A * | 10/1979 | Danis, Jr. | ............... | E04B 1/3441 52/641 |
| 4,967,520 A * | 11/1990 | Post, Jr. | .............. | E04B 1/34336 52/79.5 |
| 5,216,834 A * | 6/1993 | Crowley | .............. | A01G 9/1438 47/17 |
| 6,253,517 B1 * | 7/2001 | Fancher | ................ | E04B 1/6187 52/127.11 |
| 8,381,454 B1 * | 2/2013 | Robinson | ................. | A01K 1/00 135/159 |
| 2009/0014044 A1 * | 1/2009 | Hartman | ............... | E04B 1/3445 135/143 |

(Continued)

FOREIGN PATENT DOCUMENTS

WO PCT/US2016/038444    2/2012

*Primary Examiner* — Monica L Williams
(74) *Attorney, Agent, or Firm* — Fish IP Law, LLP

(57) ABSTRACT

The invention could be a prefabricated modular greenhouse comprising a plurality of sections, each section constructed from a framework further creating an open space that is enclosed by a cover attached to the framework; a first group of sections from the plurality of sections forming a plurality of foldable panels, two or more foldable panels being connected together in a manner to allow the one foldable panel to fold upon the second foldable panel for a compact state; a second group of sections from the plurality of sections are connected together to form at least one non-foldable panel; and the connected non-foldable panels and the at least one foldable panel being removably connected to form an assembled modular greenhouse that allows additional non-foldable panels non-foldable panels or both to be added to assembled modular greenhouse to subsequently change one or more architectural details of the assembled modular greenhouse.

20 Claims, 36 Drawing Sheets

(56) References Cited

U.S. PATENT DOCUMENTS

2010/0077683 A1* 4/2010 Lyons .................... E02D 27/02
  52/274
2015/0121776 A1* 5/2015 Peterson ............... E04B 1/3445
  52/79.5
2017/0356182 A1* 12/2017 Caffaratti Giro ......... E04H 1/12

* cited by examiner

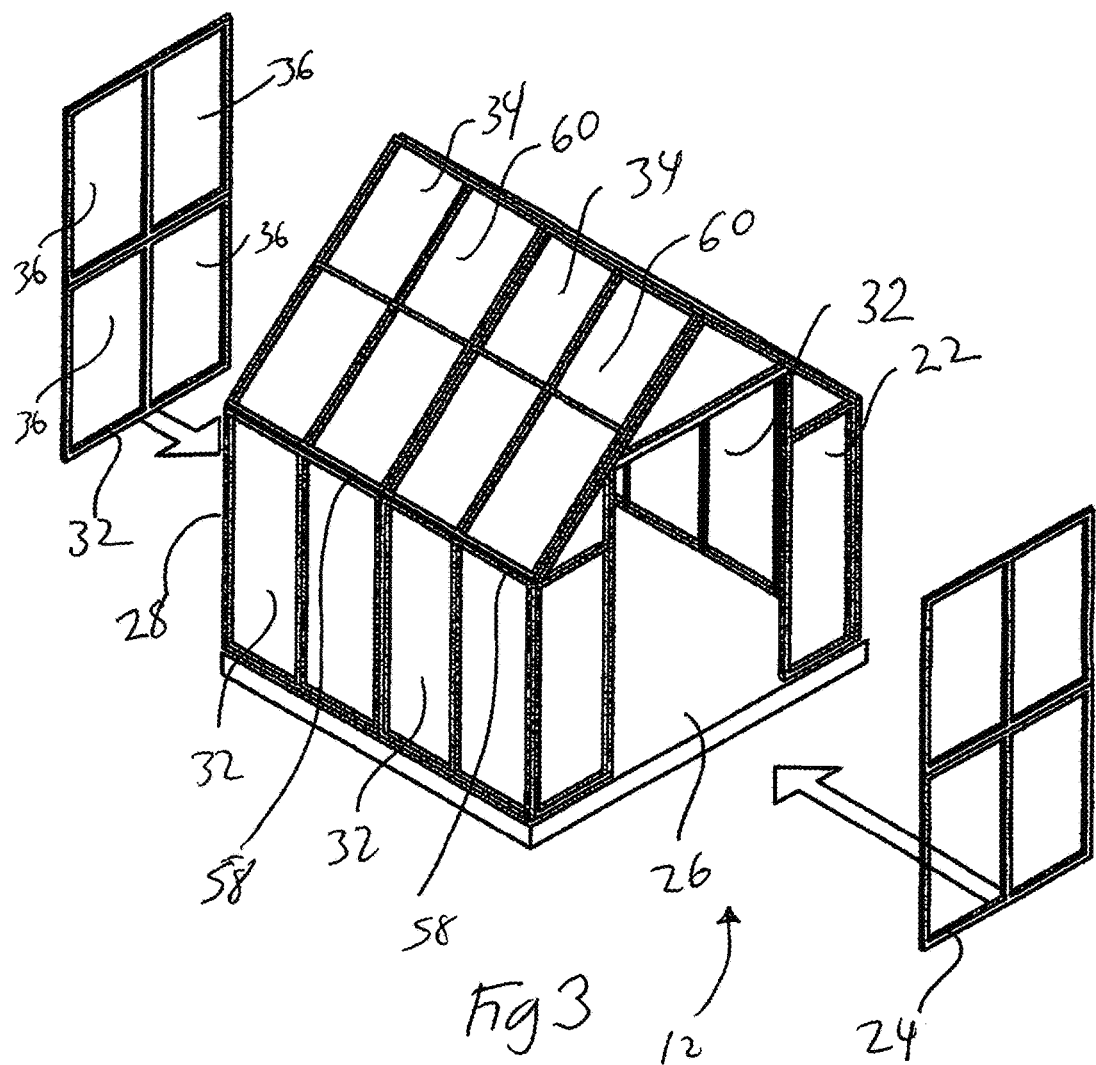

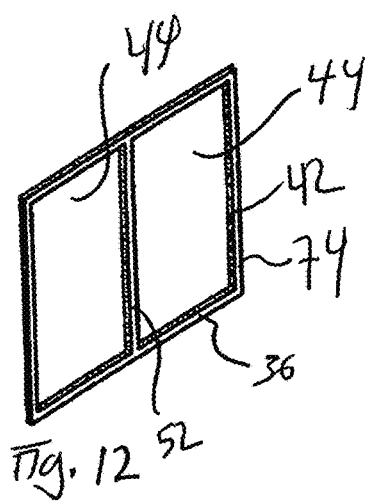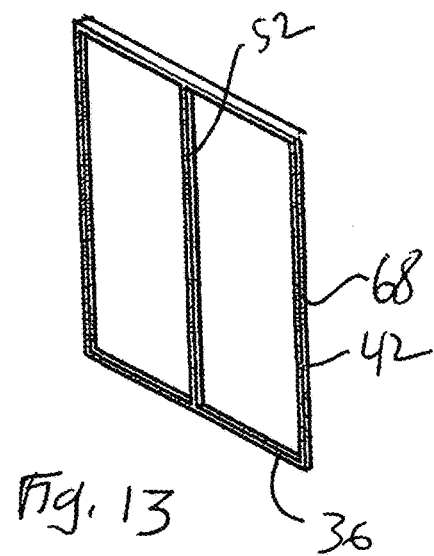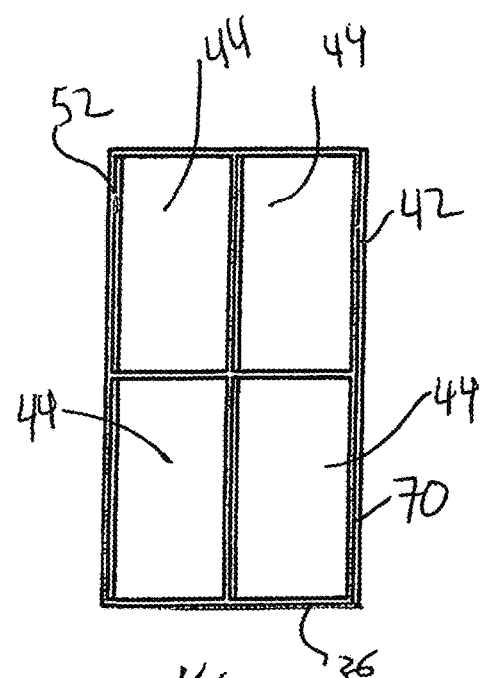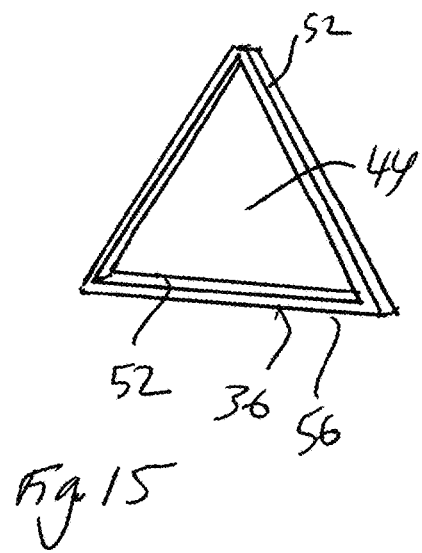

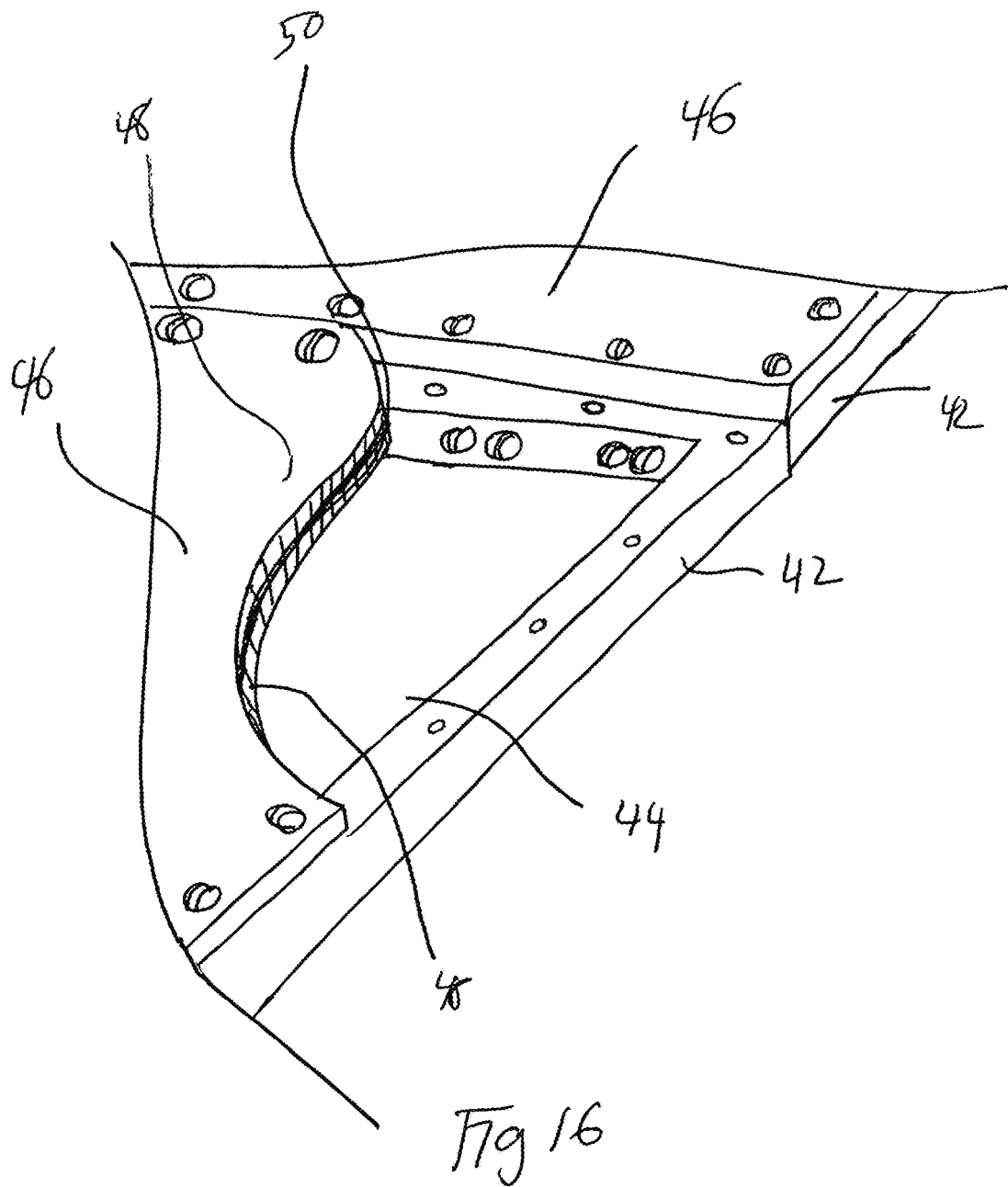

MODULAR GREENHOUSE WITH A METHOD

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention may apply to modular prefabricated greenhouses and various methods of construction for same.

BACKGROUND

A greenhouse, generally a building in which plants may be grown, could have a noticeable characteristic of having one or more outer walls, a roof or both that generally allow light (e.g., solar radiation) to pass from the outside environment through the said sides, roof or both and on into the greenhouse interior (e.g., generally being transparent to translucent). The passed-through solar radiation may then be generally absorbed by green house interior structures, plants or both. While the plants could absorb various solar radiation bands (e.g., visible light, etc.) to operate in a photosynthesis condition (vs in a respiration condition in a lack of solar radiation/artificial light), the infrared band of solar radiation (i.e. heat) could be absorbed and then be radiated outward by greenhouse interior structures (convection heating of the interior.) The heat so directed may be retained in the greenhouse interior by the greenhouse roof and walls to produce a "hot house" effect to keep the plants suitably warm in a cold external environment.

With these capabilities greenhouses can be used for growing and sustaining various plant life such as flowers, vegetables, fruits, transplants and the like. Especially with increased of awareness in "going green" and having a more ecologically friendly and non-fossil fuel operating system and as well as increased awareness of providing natural-based plant food substrates through hydropic and other greenhouse-based growing means, there generally can be seen an increased interest in and usage of consumer or home gardening use greenhouses. These smaller (e.g., backyard) greenhouses may come in Do-It-Yourself ("DIY") prefabricated assembly kits. These boxed or pallet-based kits generally provide many if not all the basic parts for a consumer to assemble into a greenhouse in a step-by-step process. Many times, these greenhouse assembly kits may little or confusing instructions that may be difficult for some consumers to follow. In addition, the actual greenhouse assembly can be both complex and physically demanding requiring a significant team support for assembly. These DIY greenhouses when assembled may lack sufficient structural stability such as having frame and structural support may not withstand even low level wind or snow loads. In addition, the present DIY greenhouse kits may further lack modular capability in that they lack the ability to have their capacity to be extended from the initial assembled structure.

What could be need therefor could be modular greenhouse kits that can be easily assembled by a consumer without significant team effort. Such kits could comprise of prefabricated panels made from foldable sections that could allow the panel to be folded upon itself. The folded panels could be place flat upon one another in an unassembled condition allowing those sections to be placed in a box. For greenhouse kits having a significant number of foldable panels, the greenhouse kit could be further secured to a pallet for transport and storage. The greenhouse kits could further include thorough, easy-to-comprehend and follow instructions that could provide a step-by-step assembly that generally does not requiring a large team support to put together the greenhouse kit. The foldable panels when unfolded could form whole or part walls, roof, ends and the like that could be locked together (e.g., with fasteners) to form an integrated and substantial greenhouse structure that could withstand significant wind, seismic and snow loads as well as uphold to other environmental impact factors. The modularity of the greenhouse kits could allow additional kits to be assembled that could be integrated into the original assembled greenhouse as needed or desired to substantially increase the interior capacity of the greenhouse as well as alter or otherwise enhance the greenhouse's abilities, footprint or both.

In at least one embodiment, one of the greenhouse kits could have one or more foldable panels be made from generally non-translucent or opaque material in addition to or in substation for the translucent section material. Foldable panels made of non-translucent or opaque foldable panels that could significantly alter, reduce, block or the alike the passage of the solar radiation into one or more parts of the assembled greenhouse's interior. In at least one embodiment, one or more sections forming a panel could be hinged together by adjacent edges to allow the panel to fold upon itself.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to provide a prefabricated and modular greenhouse in kit form at can be assemble by one person with minimum amount of help;

provide a prefabricated and modular greenhouse in kit comprising of sections forming walls, ends and roof portions, one or more of the sections from a portion being foldable upon themselves to be placed in compact state;

the ability to add additional structural components to a prefabricated and modular greenhouse to increase the overall square footage as well as to generally to enhance or otherwise alter the capacity of the assembled greenhouse so enhanced;

provide sections hinged to one another to form a foldable section to create a wall, end or roof portion used in assembling a prefabricated modular greenhouse;

the ability to redesign a preassemble prefabricated and modular greenhouse by adding foldable portions to the greenhouse to replace existing portions, add to existing portions or both;

provide foldable opaque portions can be subsequently replace or connect to one or more translucent portions of an assembled prefabricated and modular greenhouse to alter the capability of the assembled greenhouse;

the ability to assembled foldable portions into a greenhouse by clipping the portions to one and other;

provide a prefabricated and modular greenhouse kit in which foldable portions are removably clipped together to assemble the greenhouse and to subsequently disassemble, enhance or otherwise alter the original arrangement of the assembled greenhouse; and the ability to alter an assembled prefabricated and modular greenhouse to change various architectural details of the assembled greenhouse; and provide an assembled prefabricated modular greenhouse comprising at least a panel providing first characteristic that can be substituted for a panel lacking the first characteristic and providing instead a second characteristic different from the first characteristic.

These and other advantages may be realized by reference to the remaining portions of the specification, claims, and abstract.

SUMMARY OF THE INVENTION

One possible embodiment of the invention could be a modular greenhouse that is prefabricated at a first site remote from a second site where the greenhouse is subsequently assembled, comprising a plurality of sections, each section constructed from a framework, the framework further creating an open space within the framework, the open space being enclosed by a cover attached to the framework; a first group of sections from the plurality of sections forming at least one foldable panel, the first group of sections being connected together in a manner to allow the one foldable panel to fold upon itself into a compact state; a second group of sections from the plurality of sections are connected together to form at least one non-foldable panel; and the at least one non-foldable panel and the one foldable panel being removably connected to form an assembled modular greenhouse and to allow additional non-foldable panels, non-foldable panels or both to be added to assembled modular greenhouse to subsequently change one or more architectural details of the assembled modular greenhouse.

Another possible embodiment of the invention could be a method of assembling a prefabricated modular greenhouse comprising the following steps: providing prefabricated modular greenhouse comprising a plurality of sections, each section constructed from a framework, the framework further creating an open space within the framework that is enclosed by a cover attaching to the framework; a first group of sections from the plurality of sections forming at least one foldable panel, the first group of sections being connected together in a manner to allow the one foldable panel to fold upon itself into a compact state; a second group of sections from the plurality of sections are connected together to form at least one non-foldable panel; and the at least one non-foldable panel and the one foldable panel can be removably connected to assemble the greenhouse and to allow additional non-foldable panels, non-foldable panels or both to be added to the assembled greenhouse to subsequently change one or more architectural details of the assembled greenhouse; unfolding the at least one foldable panel; and removably connecting the at least one foldable panel and the at least one non-foldable panel in a manner to form an assembled greenhouse.

The above description sets forth, rather broadly, at least one summary of an embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE FIGURES

The present invention will be more fully understood by reference to the following drawings which are for illustrative, not limiting, purposes.

FIG. 3 substantially shows a perspective view of one possible embodiment for an elongated side wall (using two wall-roof combinations) modular greenhouse with a door and door plug sections.

FIG. 12 substantially shows a perspective view of an end wall section.

FIG. 13 substantially shows a perspective view of a side wall section.

FIG. 14 substantially shows an elevation view of roof section.

FIG. 15 substantially shows an elevation view of roof dormer section.

FIG. 16 substantially shows a perspective cutaway view of a cover attached to a framework.

DETAILED DESCRIPTION

Figure 1:
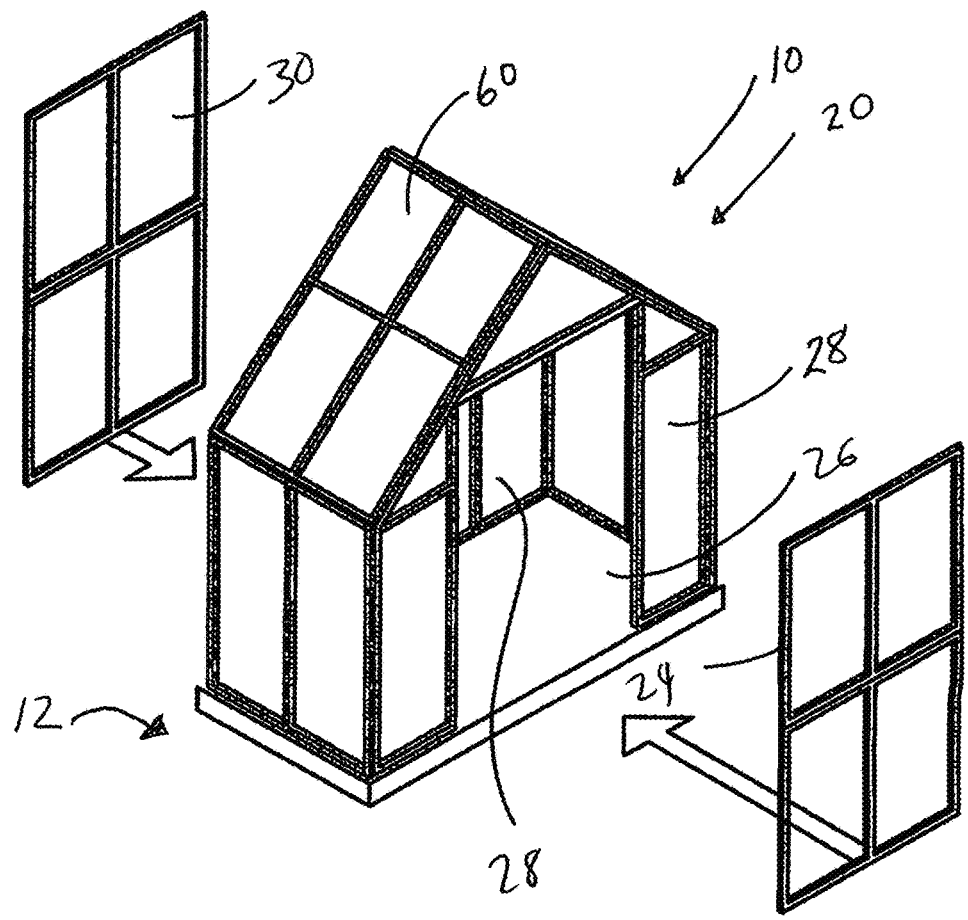
FIG. 1 substantially shows a perspective view of one possible embodiment of a basic modular greenhouse of the present invention with a door and door plug sections.

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

As substantially shown in FIGS. 1-11, one possible embodiment of the invention could be a modular greenhouse 20 that is prefabricated at one site (not shown) in a kit form that could be subsequently transported to and assembled at a second site 12 that is remote from the first site (not shown.) The modular prefabricated greenhouse 20 could be generally be designed and made to have sufficient structural integrity to withstand specific lateral loads and axial loads that may be imposed from environmental factors such as wind, snow, and seismic exposure to suitably meet the necessary local building codes at or below 6000 feet elevation and could be extendable to various lengths and shapes by removably connecting several panels (folding and non-folding) together to form side walls, front and back end walls and roof of the modular greenhouse 20. In one possible embodiment, the prefabricated modular greenhouse 20 could comprise a front end wall panel 22 (e.g., further accommodating a door 24 within a doorway), a back end wall panel 28 (e.g., further accommodating a door plug 30 within a doorway), a side wall panel and roof panel combination, a door assemblies and corresponding connecting hardware. In other embodiments, the modular greenhouse kits could be configured to provide add-on assemblies (rather than a complete modular greenhouse) that can be assembled and added to original parts of the assembled modular greenhouse 20; otherwise replace original parts of the assembled modular greenhouse 20 or both.

As substantially shown in FIGS. 12, 13, 14, 15, 15A sections 36 could be combined to form the foldable panels 38 and non-foldable panels 40. Each section 36 could comprise a tubing framework 42 denoting or forming an open space 44 that could be substantially enclosed by a cover 46 attached to the section framework 42. The cover 46, affixed to the framework 42 by suitable means such as fasteners, could be polycarbonate twin wall sheet 48 about 6 millimeters thick. The sheet as a laminate could further incorporate a UV resin film 50 for additional protection against the sun.

Figure 17:
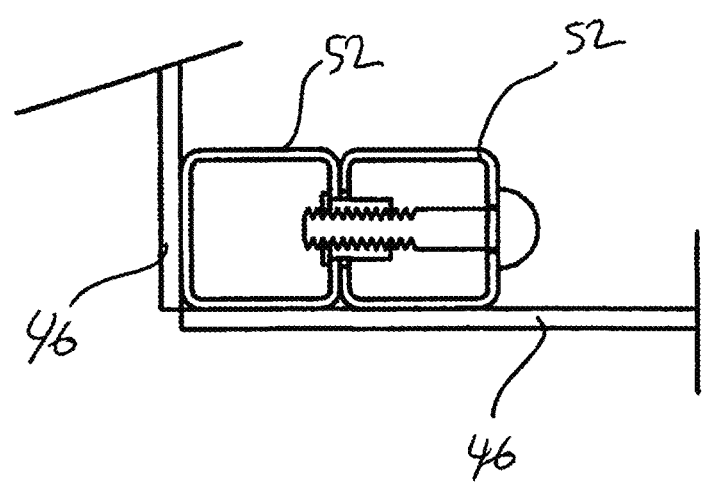
FIG. 17 substantially shows an elevation view of a first section to section attachment.
Figure 18:
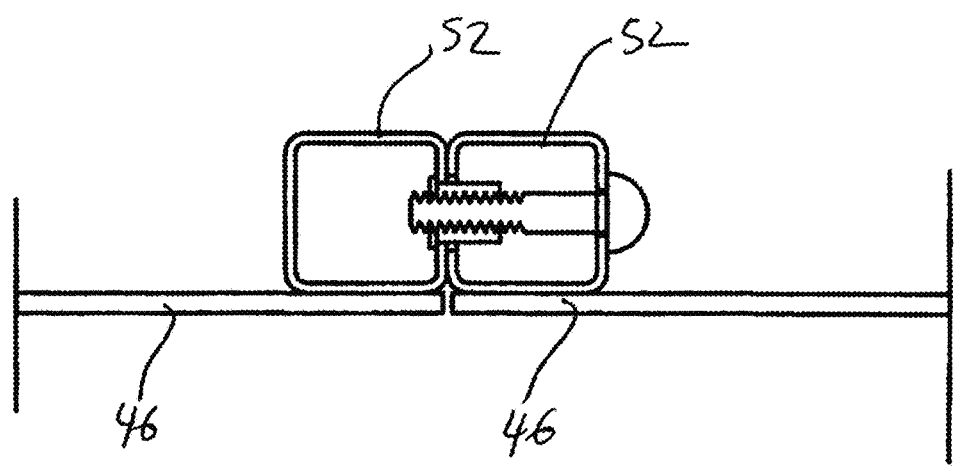
FIG. 18 substantially shows an elevation view of a second section to section attachment.
Figure 19:
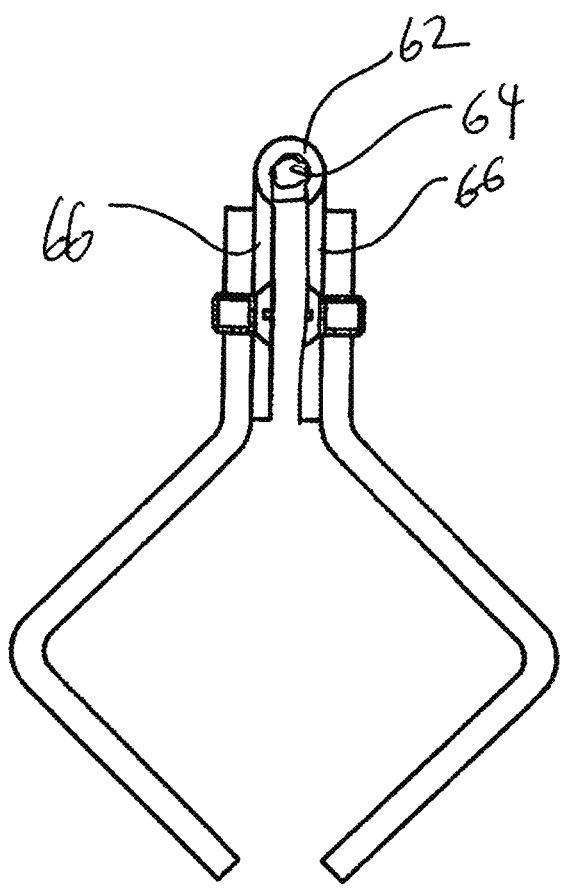
FIG. 19 substantially shows a side elevation view of hinge used for connecting two foldable panels together.
Figure 20:
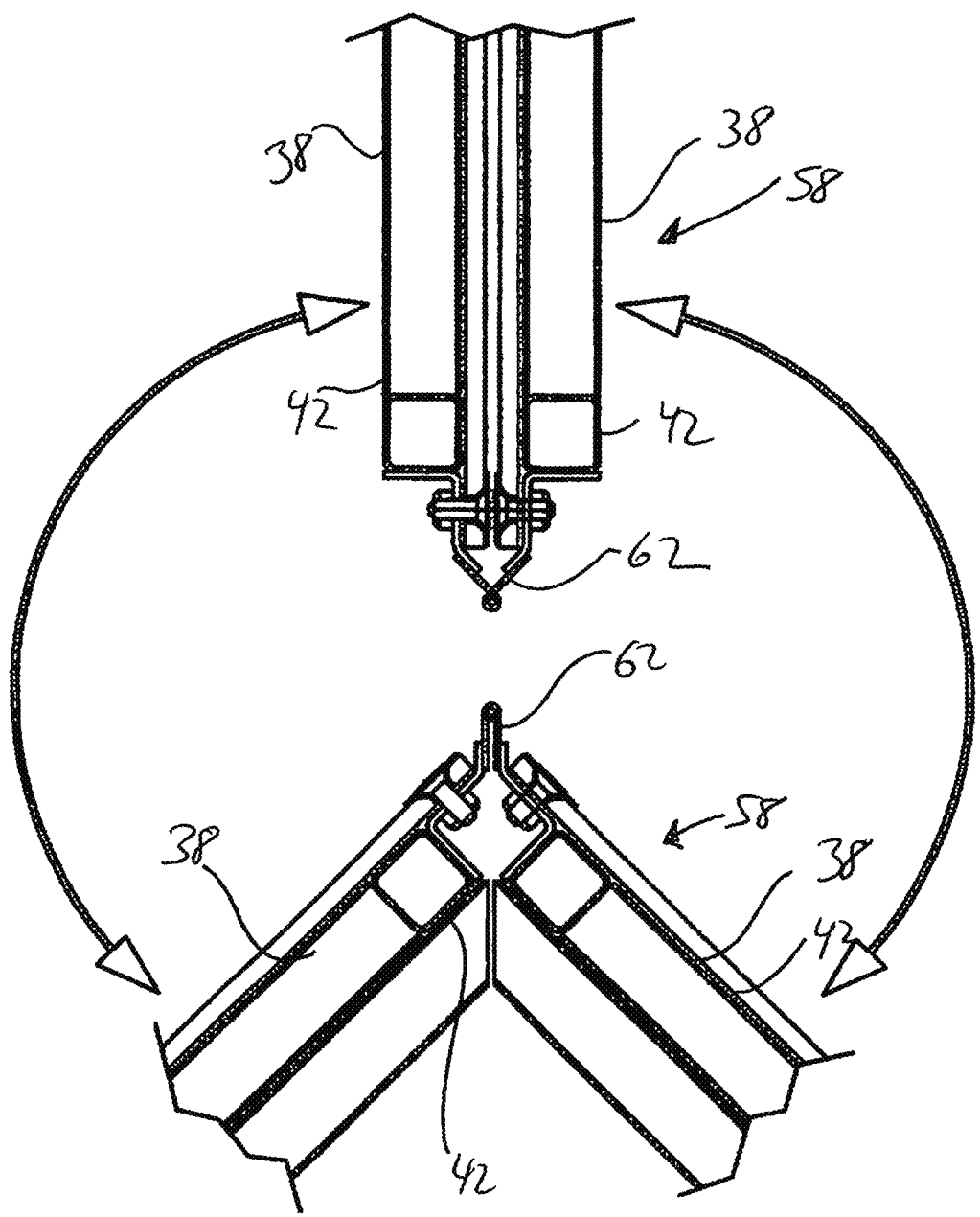
FIG. 20 substantially shows an end elevation close-up view of a hinged no foldable panel pair moving between an open operating state to a closed flat compacted storage state.
Figure 21:
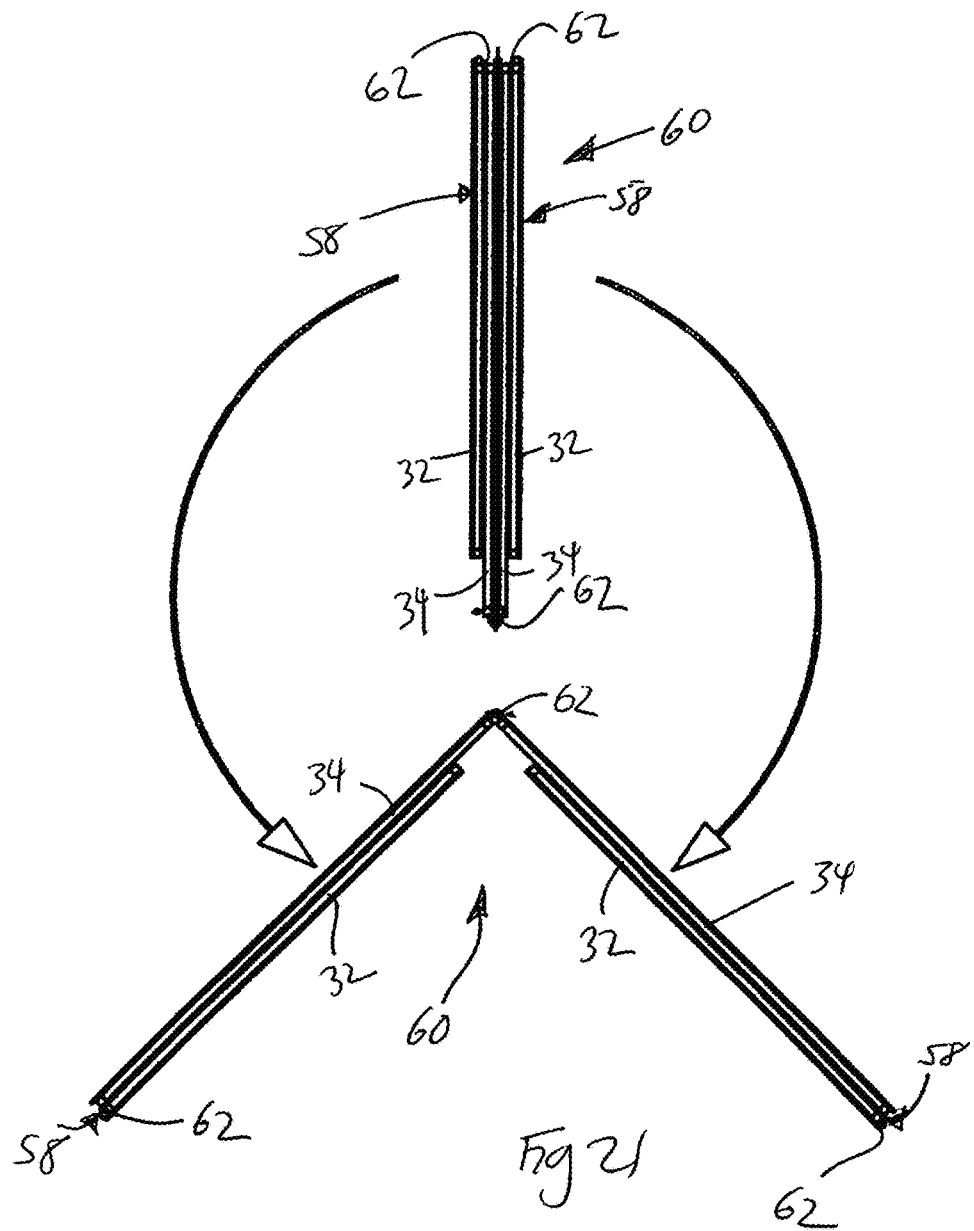
FIG. 21 substantially shows an end elevation view of a hinged sidewall-to-roof-to-roof-to-sidewall foldable panel combination moving from closed flat compacted storage state to an initial open operating state.
Figure 22:
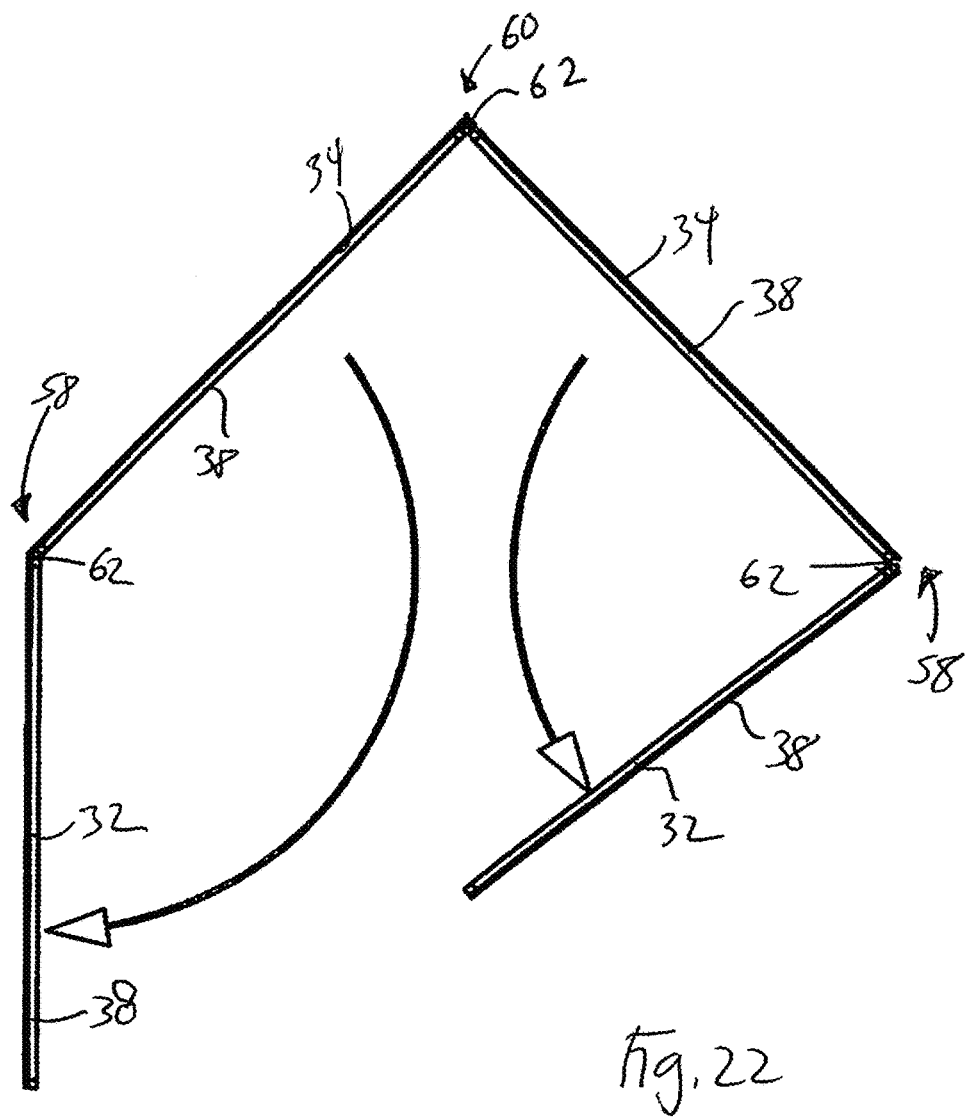
FIG. 22 substantially shows an end elevation view of a sidewall-to-roof-to-roof-to-sidewall foldable panel combination moving the sidewall panels from closed flat compacted storage state against the roof panels towards the open operating state.
Figure 23:
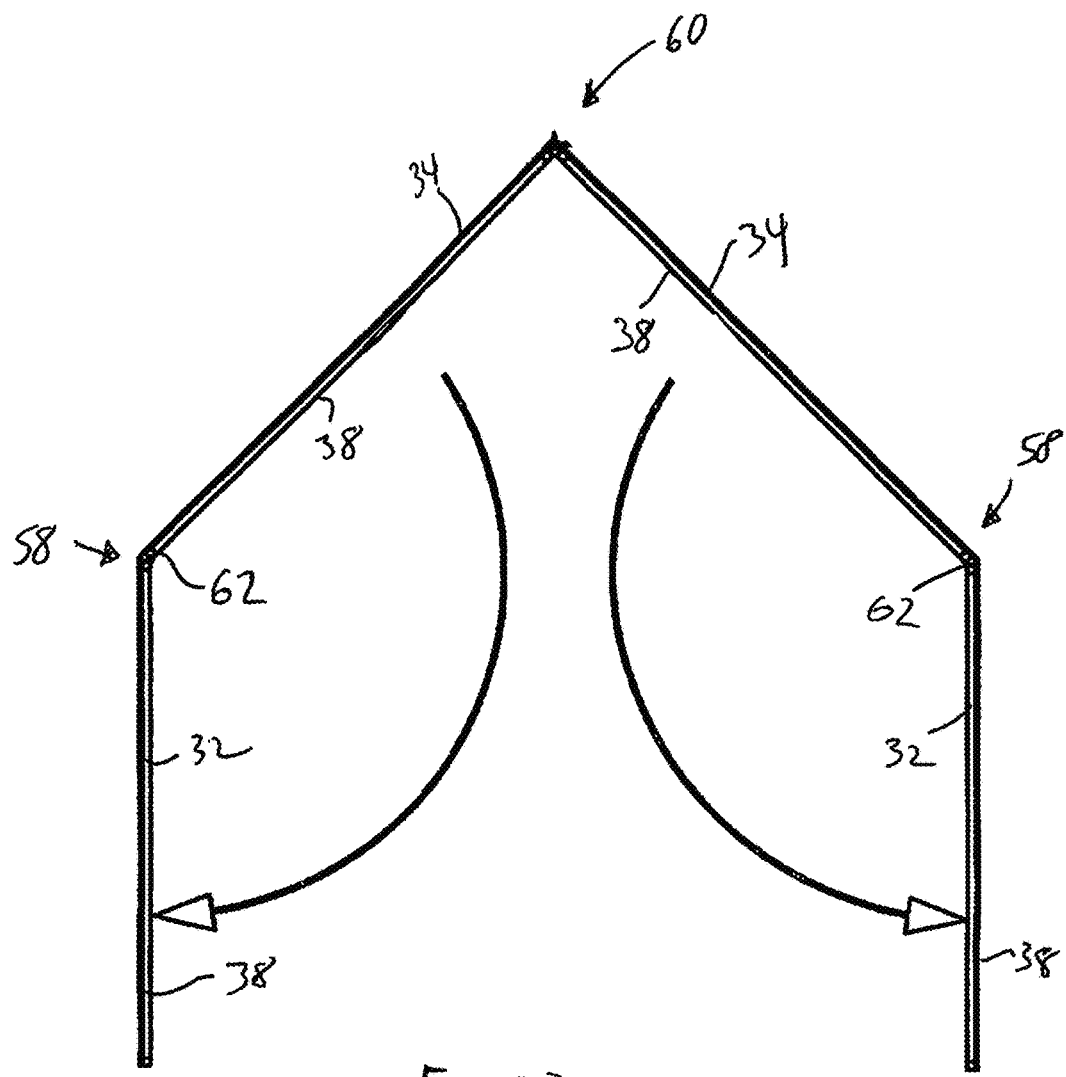
FIG. 23 substantially shows an end elevation view a sidewall-to-roof-to-roof-to-sidewall foldable panel combination as moved into the open operating state.

The section framework 42 in one possible embodiment generally be rectangular in shape (e.g., 2 feet by 4 feet) and could be formed from the circular or square tubing 52 (e.g., made from metal, alloy, composite or the like.) Other panels, such an end wall non-foldable panel 22, 28 or a roof dormer foldable panel 54 could further require triangular shaped sections 56. As substantially shown in FIGS. 16 and 17, the sections 36 could be fastened together at respective adjacent tubing edges to form folding panels 38 and non-folding panels 40.

The tubing 52 for the section framework 42 should be made strong enough at a minimum to support the weight of the assembled greenhouse. The tubing 52 for standard size prefabricated modular greenhouses 20 could be 1-2 inch width tubing while larger sized greenhouses many need wider width tubing, such as 2.5 inch or 3 inch width tubing. Similarly, smaller prefabricated modular greenhouses 20 may only need tubing of 1 inch width. The framework 42 if manufactured from metal can be further coated with a powder coating enamel that will last for 10 years or more to generally provide some protection against oxidation/rust. The prefabricated holes may be drilled and machined into the framework to ensure exact and precise alignment with the connecting hardware to connect various sections together to form a respective panel. Fasteners such as removable clips (not shown) could be employed to provide some removable bale panel-to-panel connections.

As substantially shown in FIGS. 19-23, the foldable panels 38 can be removably and movably connected together to form foldable panel pairs 58 or combinations 60. In one embodiment, this connection of foldable panels could be a hinged connection such as a piano hinge 62. The piano hinge 62 comprising a rod or wire 64 movably holding the two hinge sides 66 movably together may be removed to allow separation of the panels at the two hinge sides 66. When the wire 64 s removed, one hinged edge of one foldable panel 38 could be disengaged with another hinged edge of other foldable panel 38 to take apart a foldable panel pair or combination (e.g., a wall-roof foldable panel pair). This could allow a substitution of different folding panels 38 within the folding panel combination or pair. Upon substitution the rod or wire 64 could be inserted to respective the hinge sides 66 to connect two folding panels 38 together. Similarly a set of sidewall-to-roof foldable panel pairs 58 can be hingedly connected together to create a wall-roof foldable panel combination 60.

Figure 24:
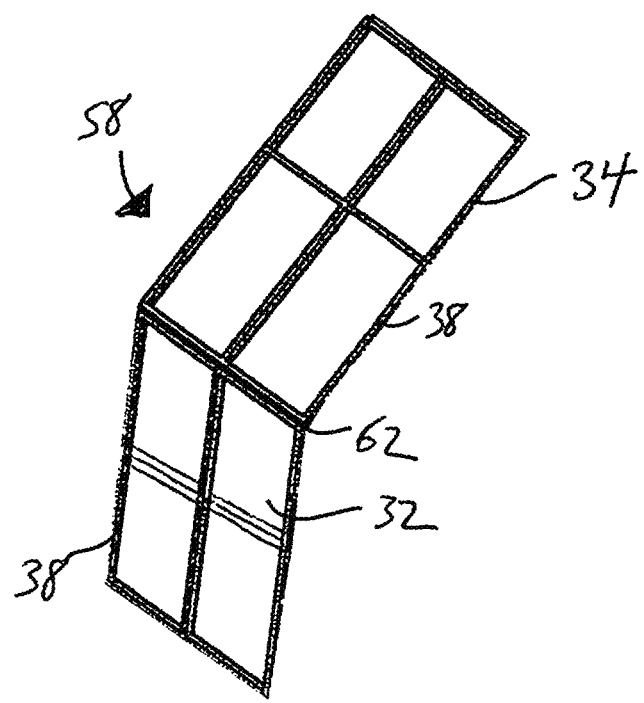
FIG. 24 substantially shows a perspective view of a sidewall to roof foldable panel pairing.
Figure 25:
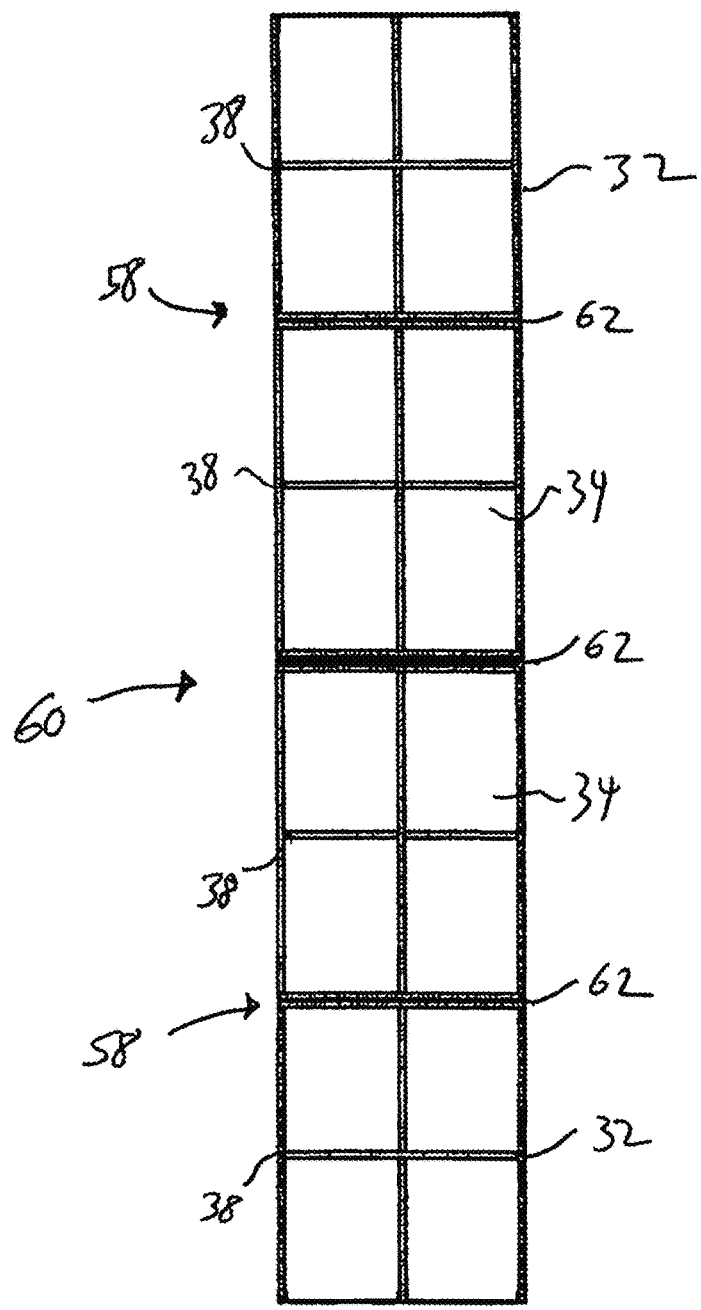
FIG. 25 substantially shows a top view of a hinged sidewall-to-roof-to-roof-to-sidewall foldable panel combination unfolded flat.
Figures 26, 27:
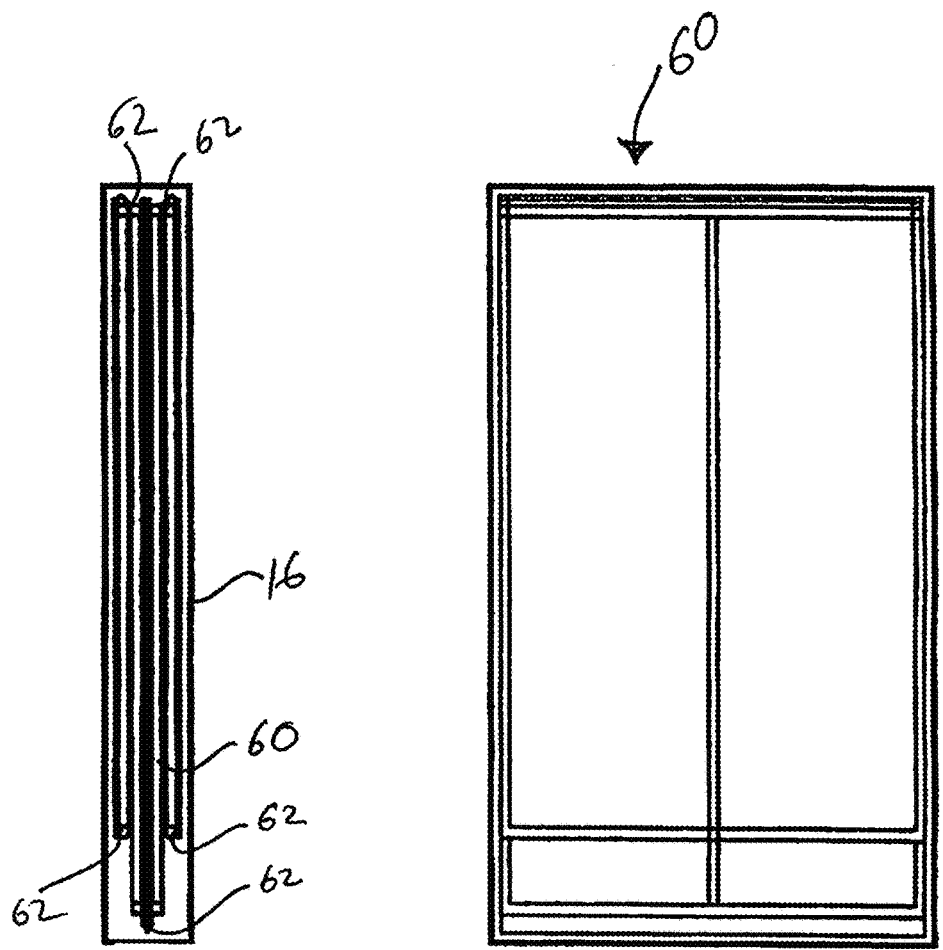
FIG. 26 substantially shows a cutaway elevation end view of a hinged sidewall-to-roof-to-roof-to-sidewall foldable panel combination folded flat in a compact state within a shipping box.
FIG. 27 substantially shows a side cutaway view of a hinged sidewall-to-roof-to-roof-to-sidewall foldable panel combination folded flat in a compact state within a box container.

As substantially shown in FIG. 24, the sidewall panel 32 could be used on either the right and left side of the modular greenhouse 20. The sidewall section 68 could comprise a rectangular framework 42 of parallel oriented vertical tubing and horizontal tubing as welded, bonded or formed together. In one version, a strengthening cross-brace could be added to reinforce the framework 42 by connecting the section's horizontal tubing pair together at respective middles. Two sidewall sections 68 could be connected together side-by-side (e.g., by fasteners) to form a sidewall foldable panel 32.

The roof panels sections 70 could be similarly constructed with a rectangular framework 42 with parallel oriented vertical tubing and horizontal tubing that are suitably welded, bonded or formed together to form the open space 44 enclosed by cover 46 attached to the framework 42. In one version a strengthening cross-brace could be added to reinforce the section framework by connecting the horizontal tubing pairs together at respective middles. Two roof sections 70 could be connected together side-by-side to form a roof foldable panel 34.

Figure 1A:
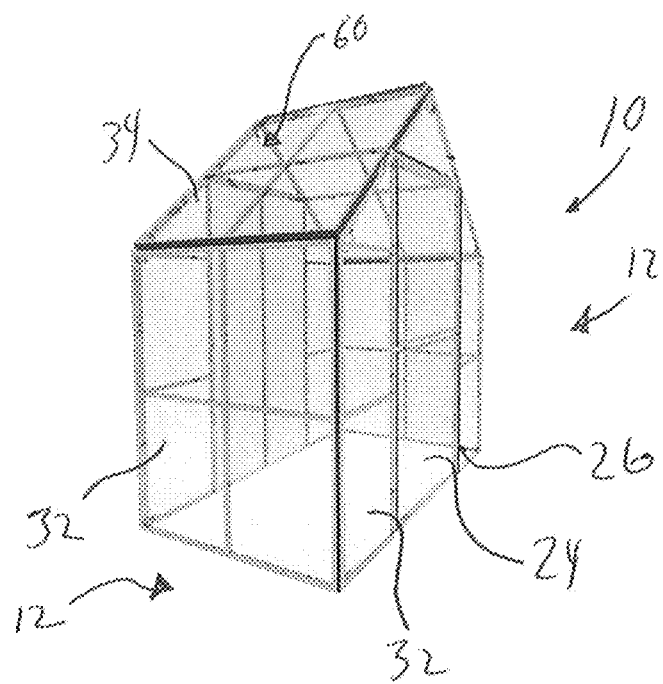
FIG. 1A substantially shows another perspective view of one possible embodiment of a basic modular greenhouse (using one wall-roof combination) of the present invention with a door and door plug sections.
Figure 2:
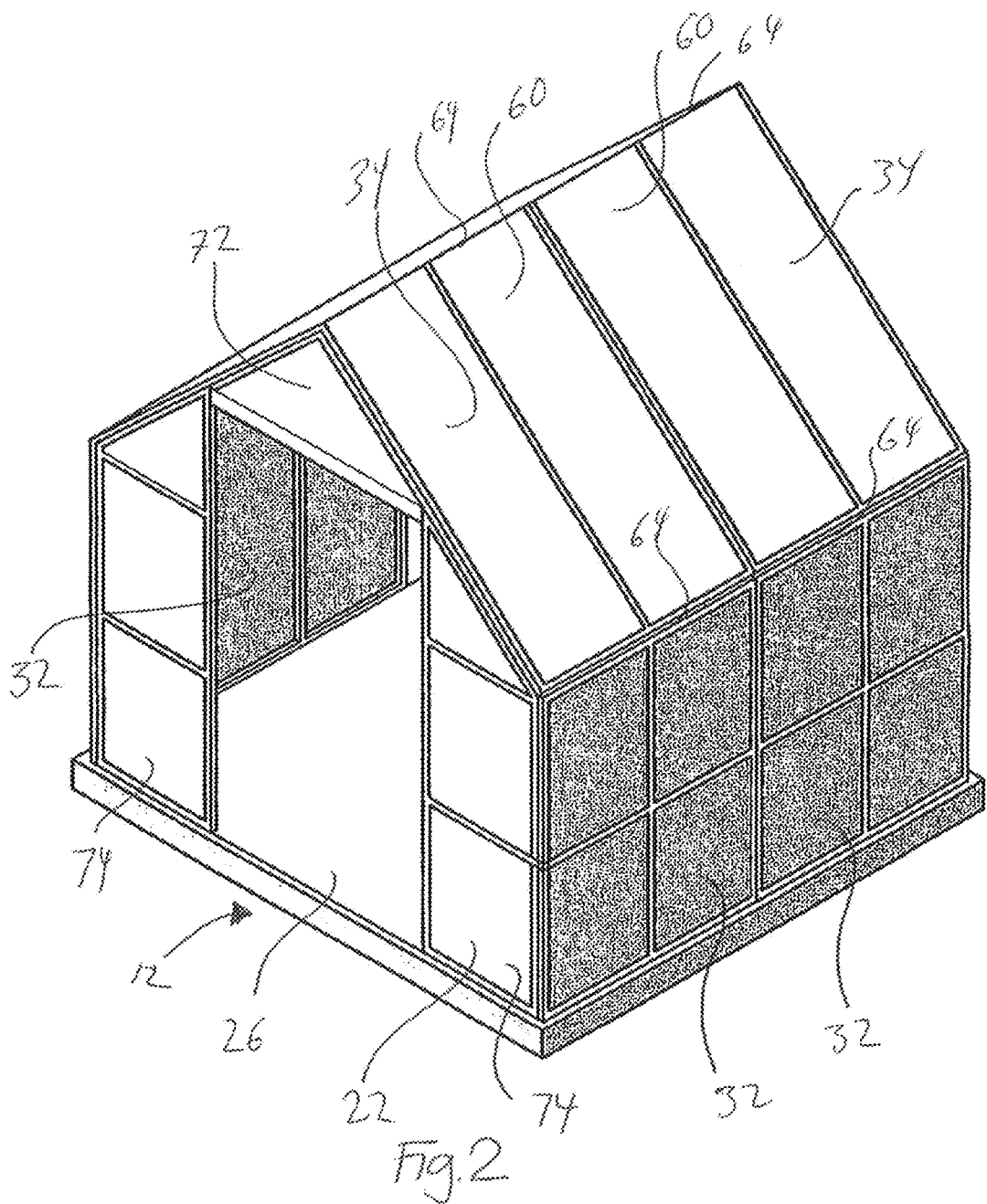
FIG. 2 substantially shows a perspective view of one possible embodiment for an elongated side wall (using two wall-roof combinations) modular greenhouse.
Figure 2A:
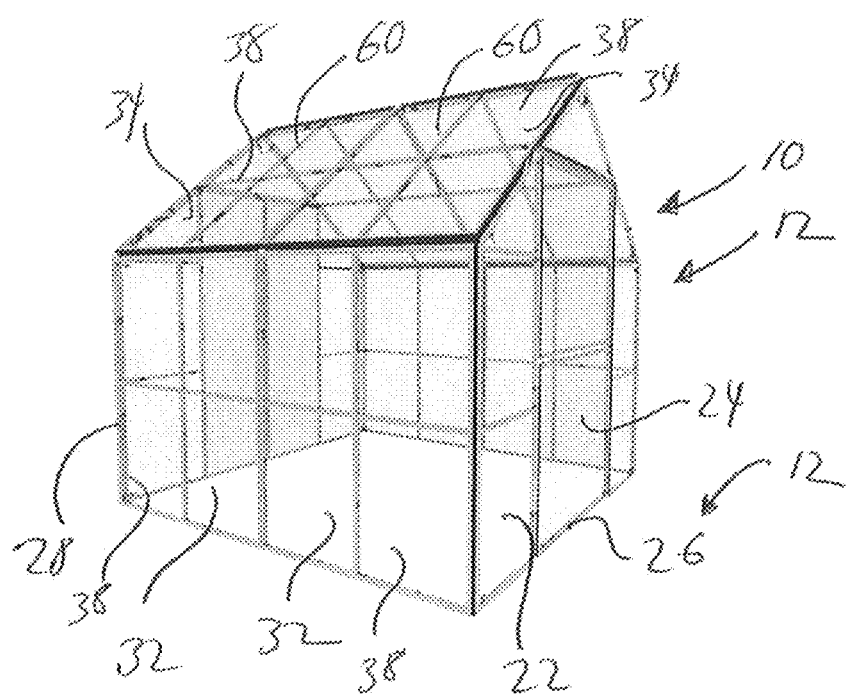
FIG. 2A substantially shows another perspective view of one possible embodiment for an elongated side wall (using two wall-roof combinations) modular greenhouse.
Figure 4:
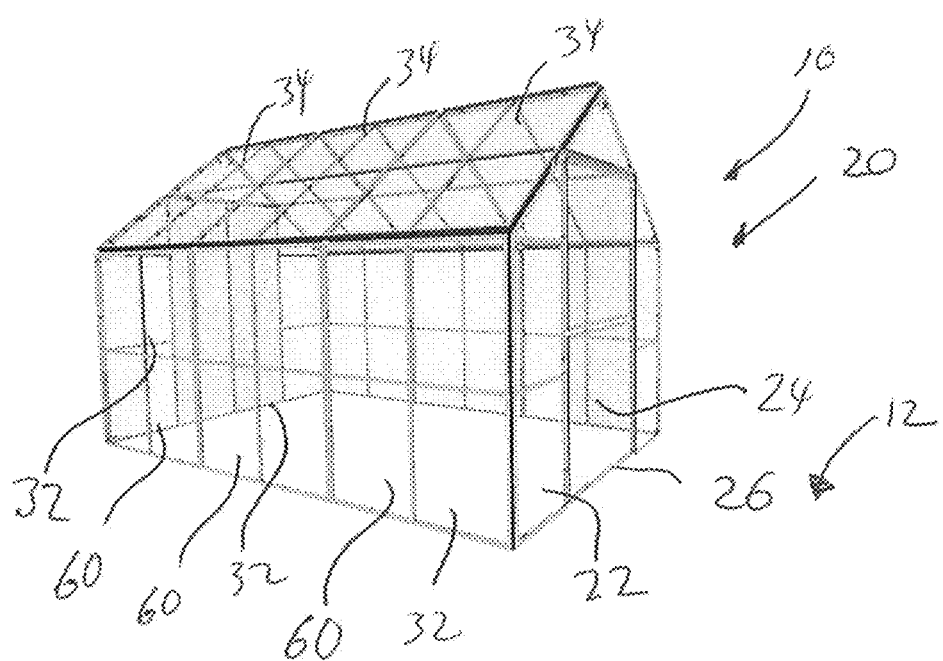
FIG. 4 substantially shows a perspective view of one possible embodiment for an elongated side wall (using three wall-roof combinations) modular greenhouse with a roof dormer architectural detail FIG. 5 substantially shows a perspective view of one possible embodiment for an elongated side wall (using three wall-roof combinations) modular greenhouse with some covers being opaque.
Figure 5:
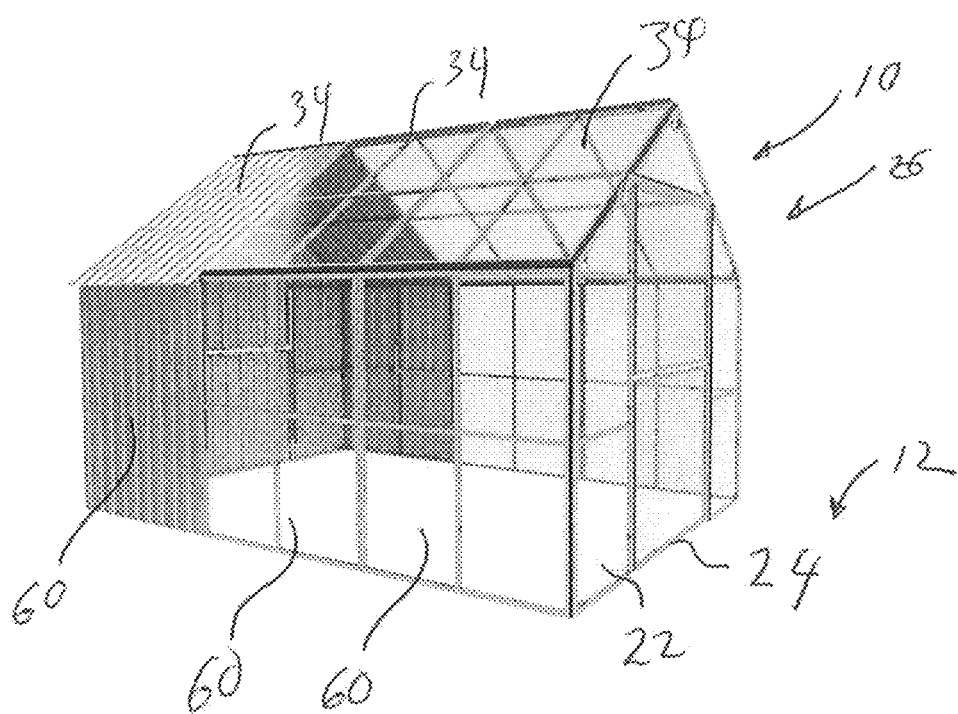
Figure 6:
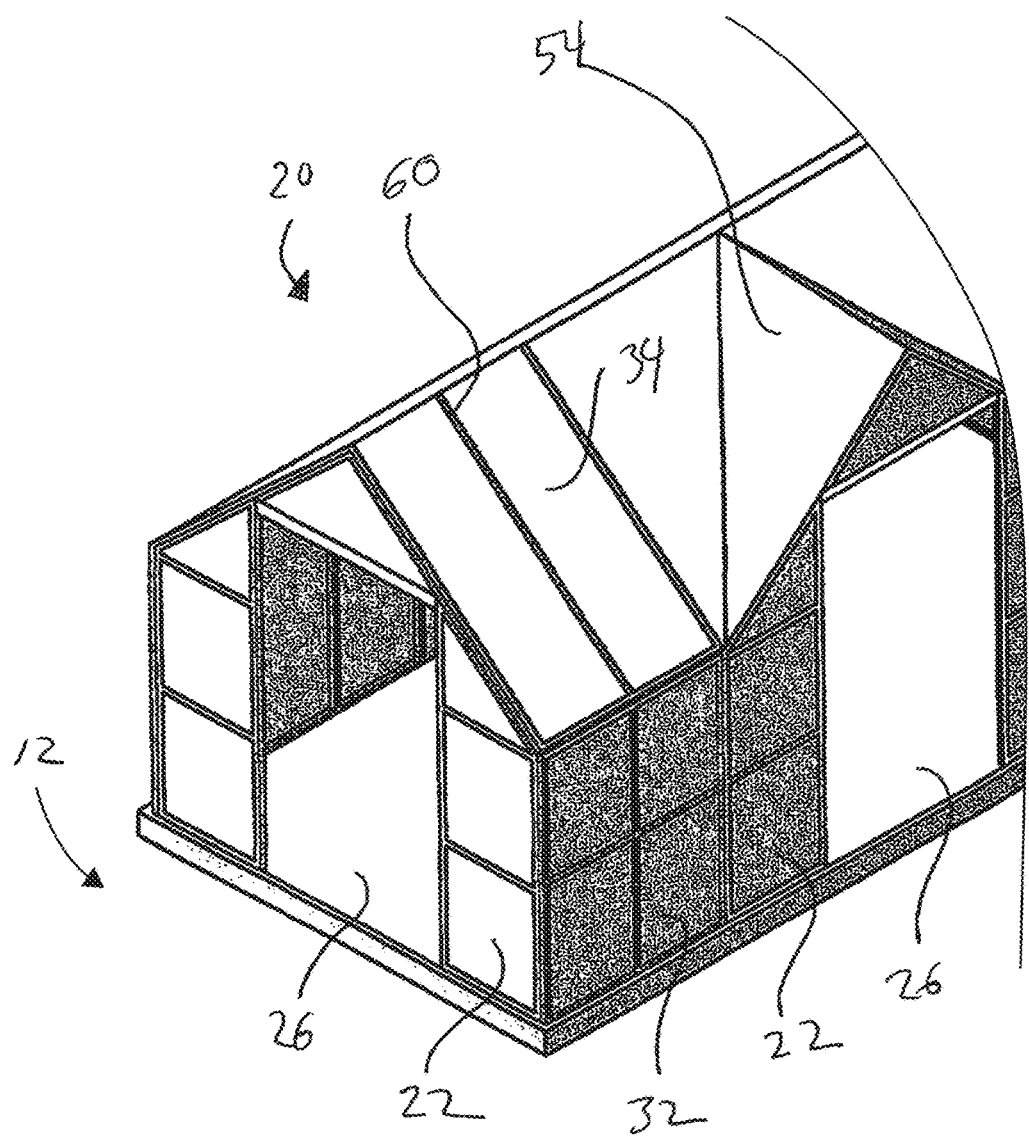
FIG. 6 substantially shows a perspective view of one possible embodiment for a modular greenhouse with a roof dormer architectural detail.
Figure 7:
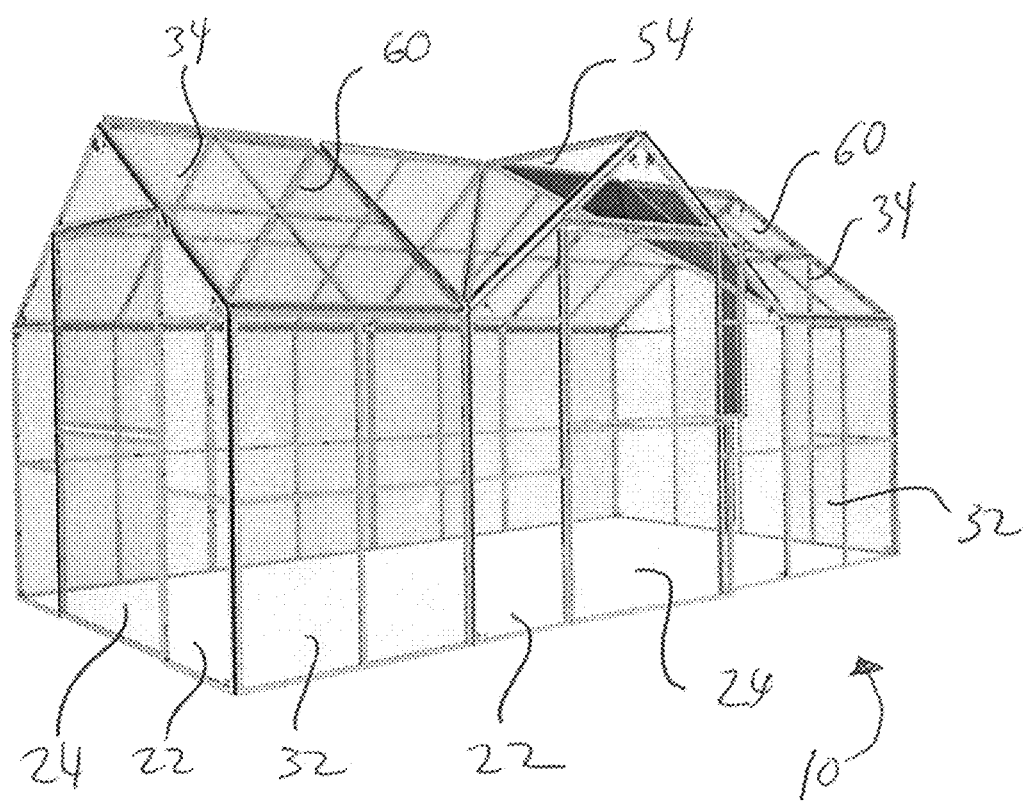
FIG. 7 substantially shows another perspective view of one possible embodiment for a modular greenhouse with a roof dormer architectural detail.
Figure 8:
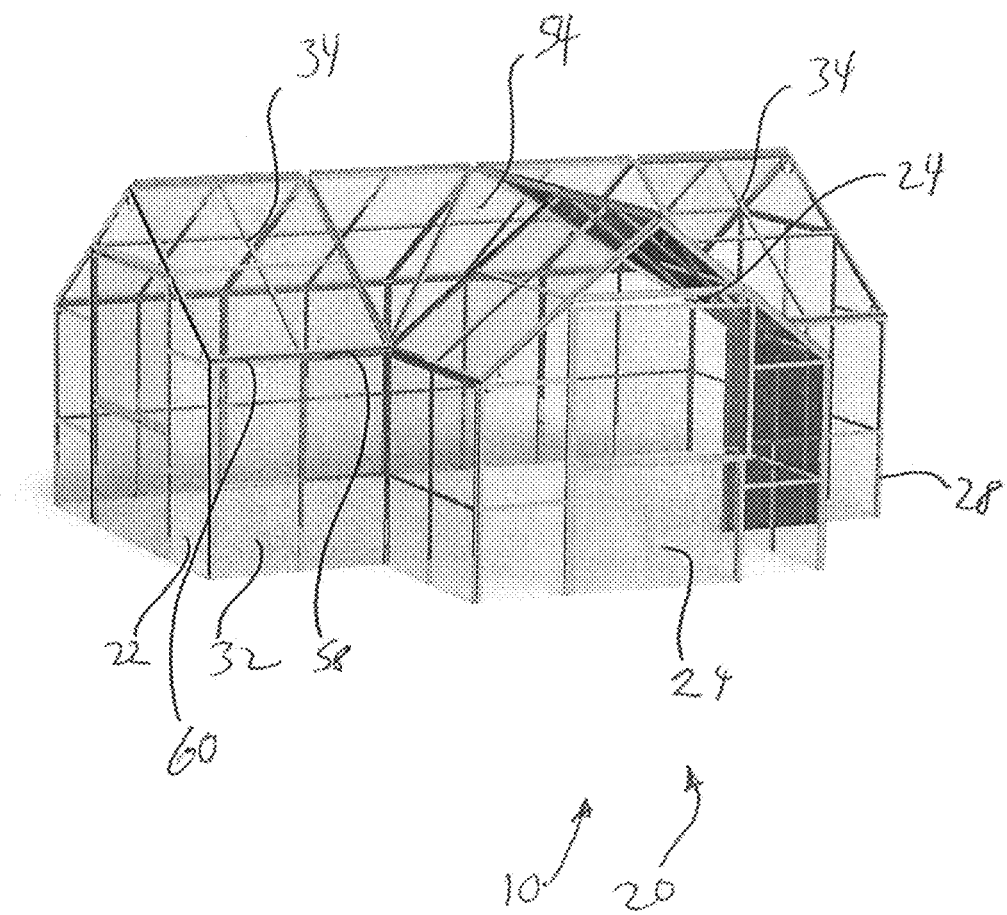
FIG. 8 substantially shows a perspective view of one possible embodiment for a modular greenhouse with a roof dormer architectural detail having a single wall-roof combination expansion.
Figure 9:
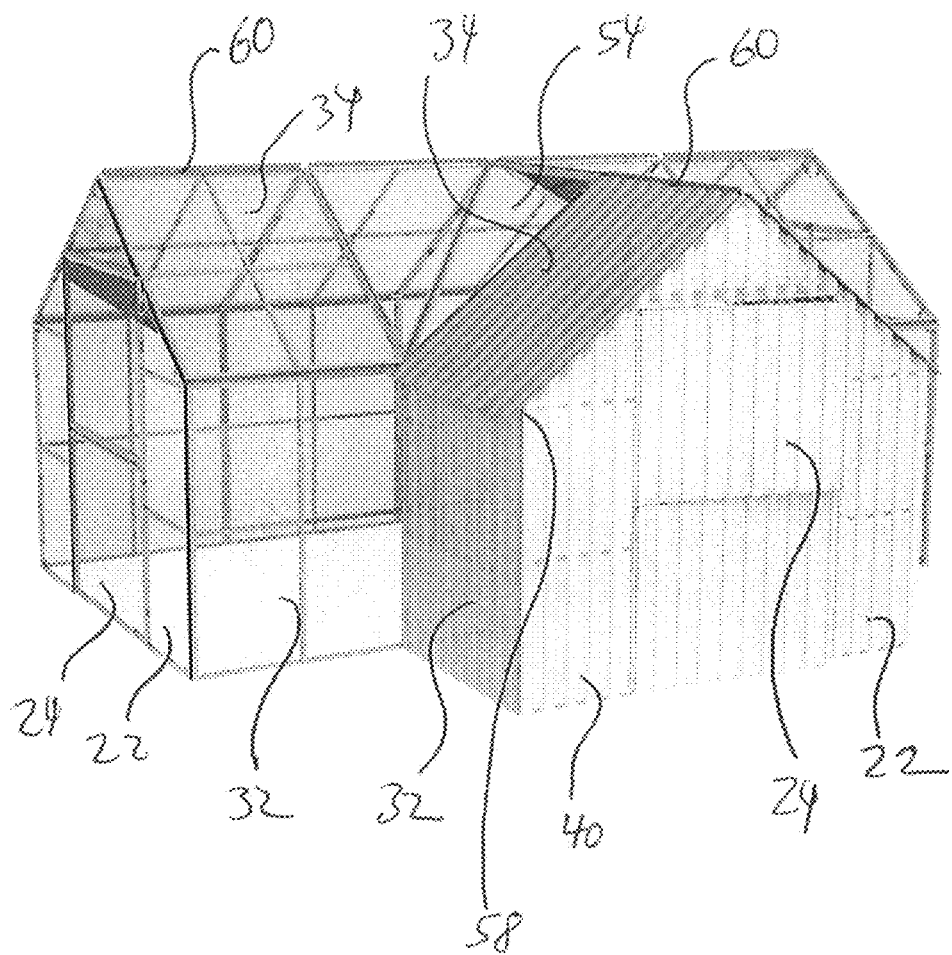
FIG. 9 substantially shows a perspective view of one possible embodiment for a modular greenhouse with a roof dormer architectural detail having a single wall-roof combination expansion whose covers are opaque.
Figure 10:
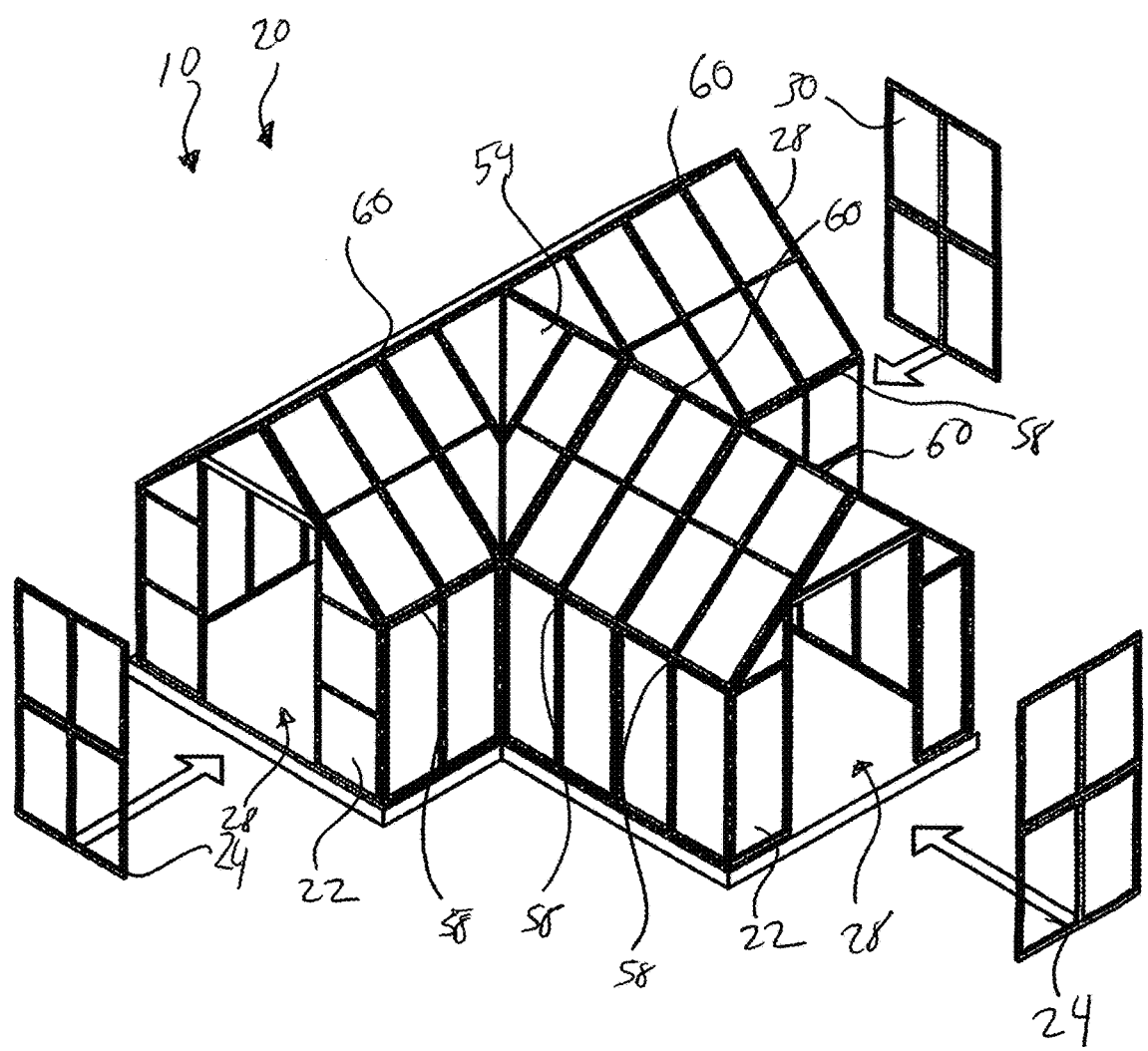
FIG. 10 substantially shows a perspective view of one possible embodiment for a modular greenhouse with a roof dormer architectural detail having a dual wall-roof combination expansion.
Figure 11:
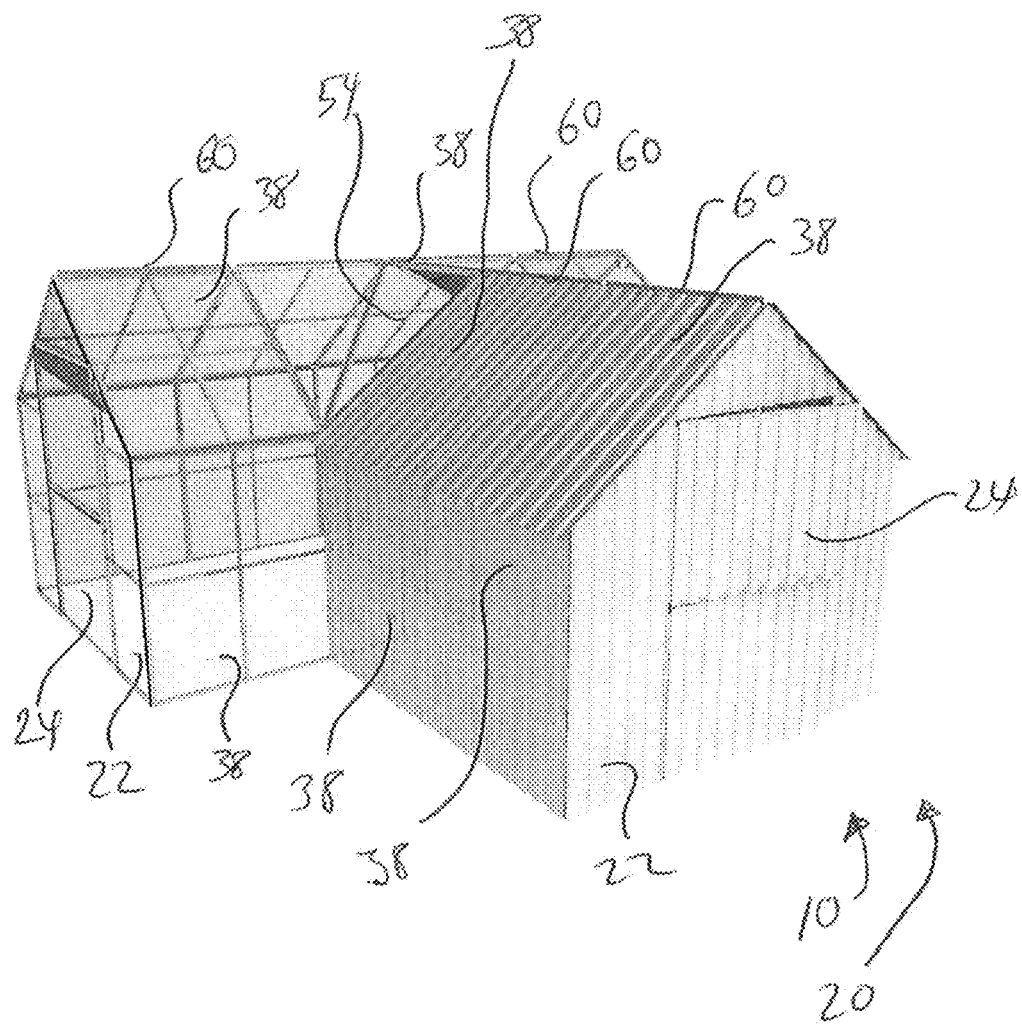
FIG. 11 substantially shows a perspective view of one possible embodiment for a modular greenhouse with a roof dormer architectural detail having a dual wall-roof combination expansion whose covers are opaque.

In one possible embodiment, one sidewall foldable panel 32 and one roof foldable panel 34 (forming a wall-roof panel combination) can be hingedly connected together (e.g., by piano hinge) to form a wall panel to roof panel pairing (as substantially shown in FIG. 24.) A hinged connection at adjacent edges (e.g., vertical tubings) could allow the wall panel to have an angled relationship to the roof foldable panel 34 when being used to form a portion of the modular greenhouse 20 and to allow sidewall foldable panel 32 to be fold against roof foldable panel 32 for stacked compact storage. Two side wall-roof panel pairings 58 could hingedly connected together at a roof panel-to-roof panel adjacent edges (e.g., adjacent roof vertical tubings) to form a sidewall-to-roof-to-roof-to-sidewall foldable panel combination 60 that could form a basic wall roof building unit for the invention 10. In this manner, the four foldable panels of the pair combination 60 could fold upon one panel upon another to put the combination 60 in a collapsed stacked state (as substantially shown in FIGS. 20-23; 25-27) for placement in a box container 16. One or more pair combinations 60 could connected together (e.g., side-by-side in a tandem orientation) could be then ended by rear and front end wall panels to substantially to form a basic greenhouse structure (as substantially shown in FIGS. 1, 1A and 2.)

Figure 28:
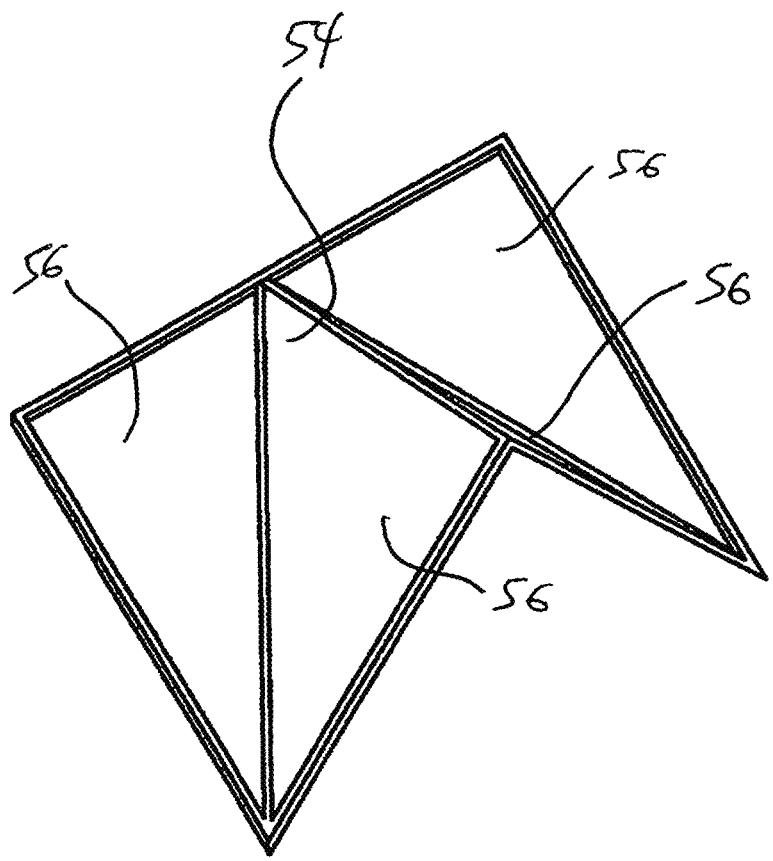
FIG. 28 substantially shows a perspective view of a dormer roof foldable panel combination folded open for use.
Figure 29:
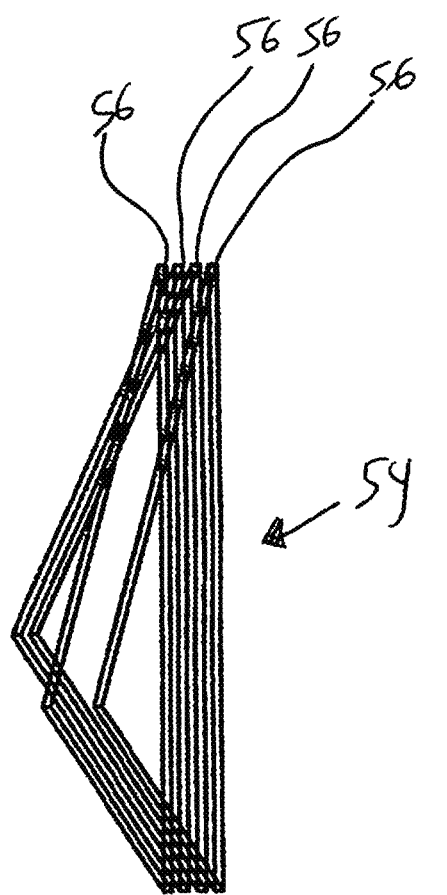
FIG. 29 substantially shows a perspective view of a dormer roof foldable panel combination folded flat in compact state.
Figure 30:
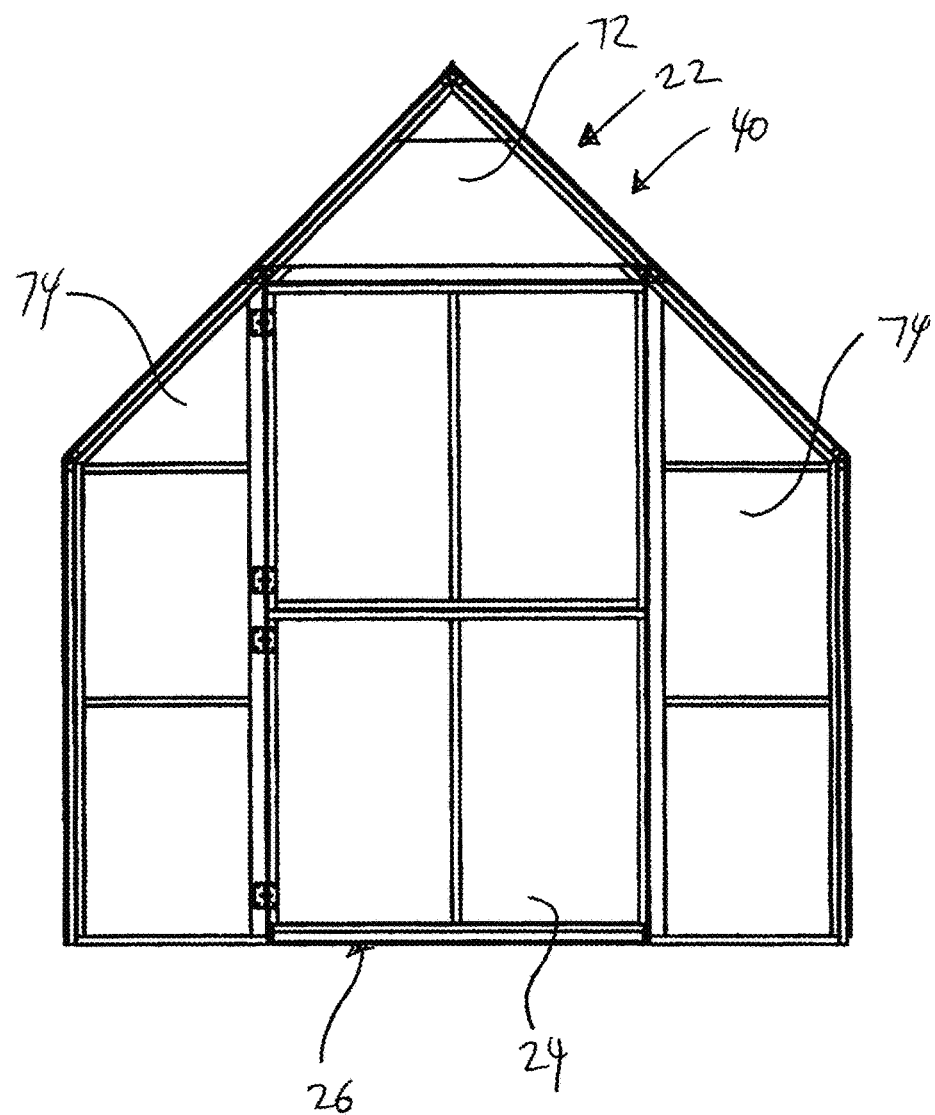
FIG. 30 substantially shows an elevation view of front end wall non-foldable panel.
Figure 31:
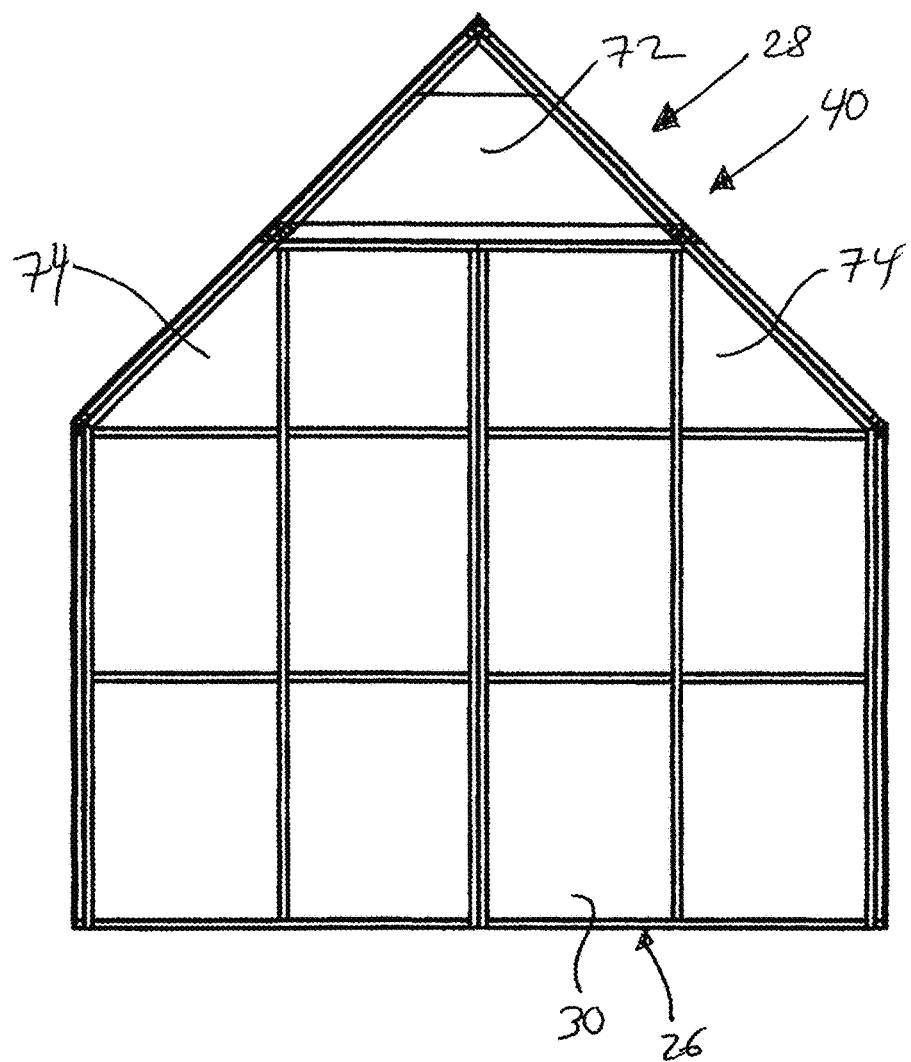
FIG. 31 substantially shows an elevation view of back end wall non-foldable panel.
Figure 32:
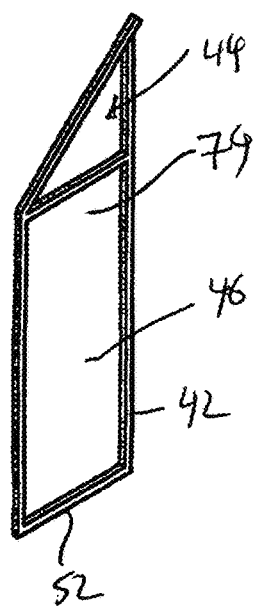
FIG. 32 substantially shows a perspective view of one end section for wall non-foldable panel.
Figure 33:
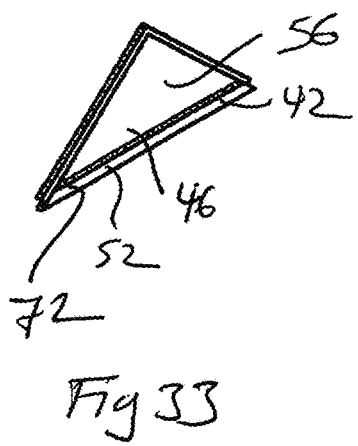
FIG. 33 substantially shows a perspective view of truss brace section for wall non-foldable panel.
Figure 34:
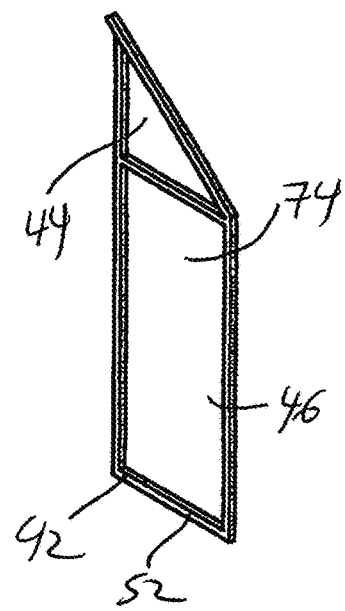
FIG. 34 substantially shows a perspective view of another end section for wall non-foldable panel.
Figure 35:
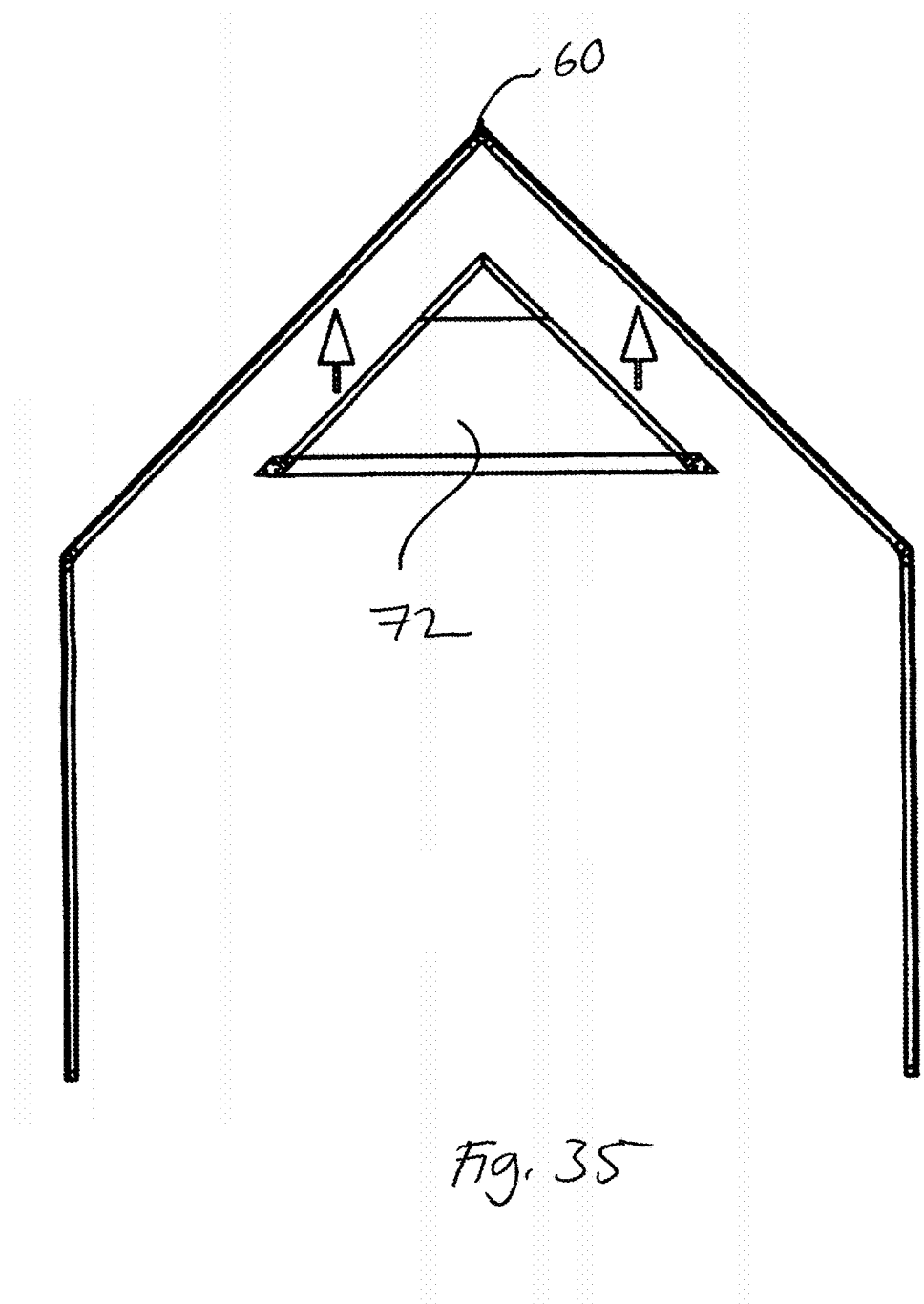
FIG. 35 substantially shows an elevation view of the truss brace section being attached to another portion of the modular greenhouse.
Figure 36:
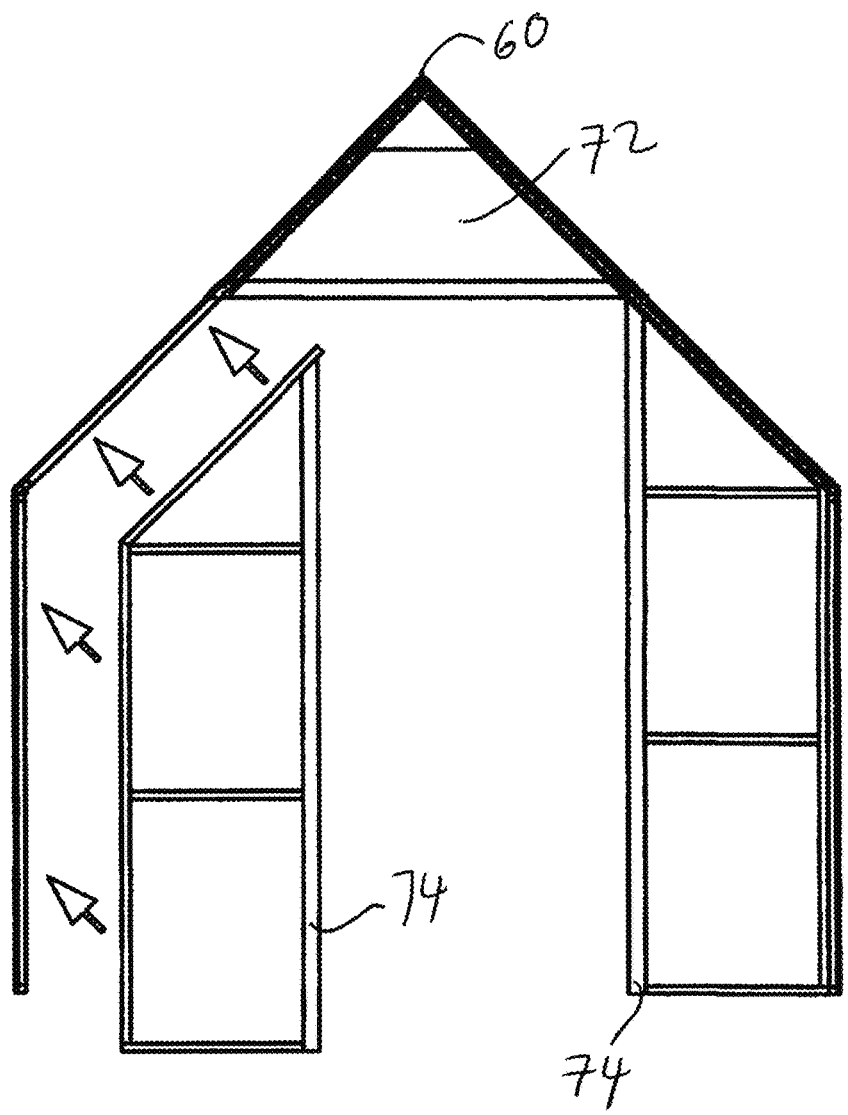
FIG. 36 substantially shows an elevation view of the end section being attached to another portion of the modular greenhouse.
Figure 37:
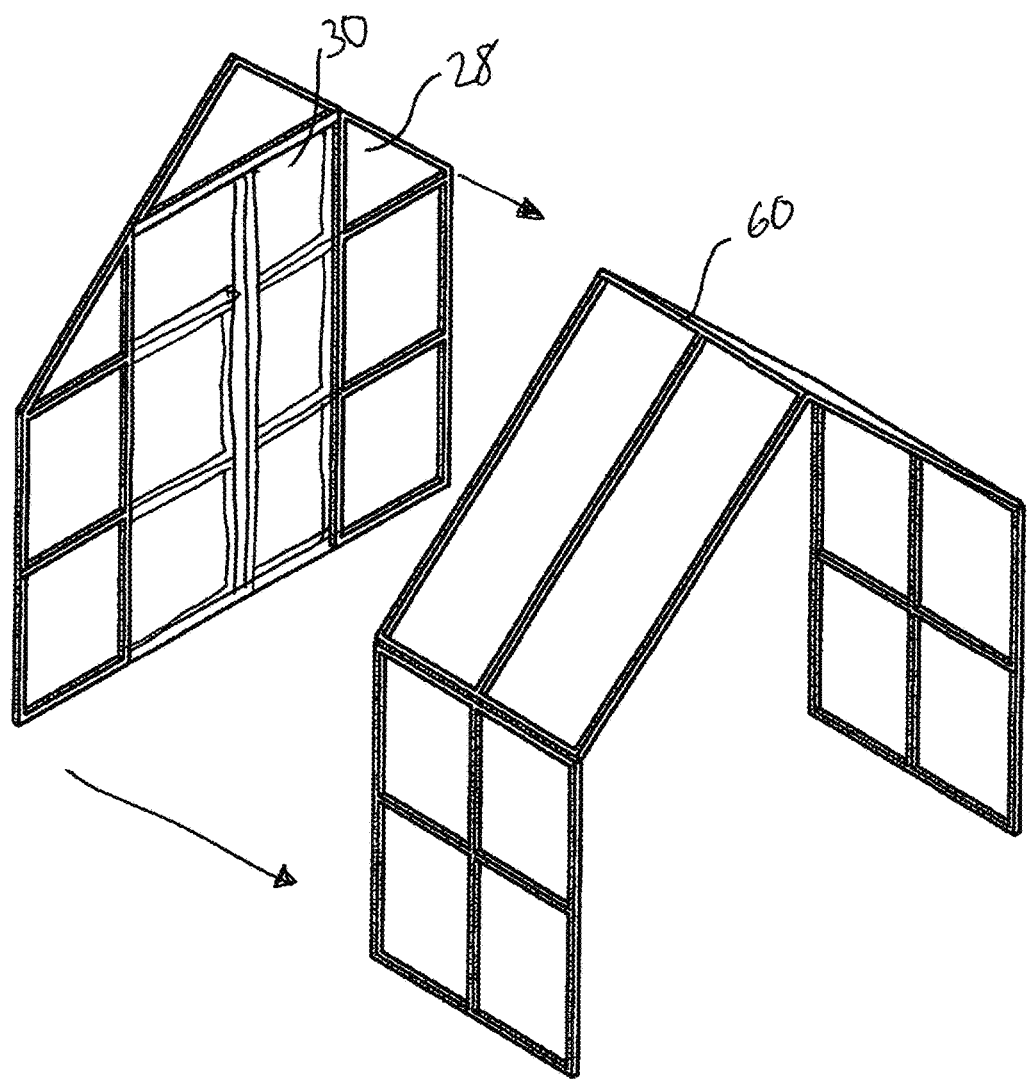
FIG. 37 substantially shows an assembled back end wall non-foldable panel being attached to a sidewall-to-roof-to-roof-to sidewall foldable panel combination.
Figure 38:
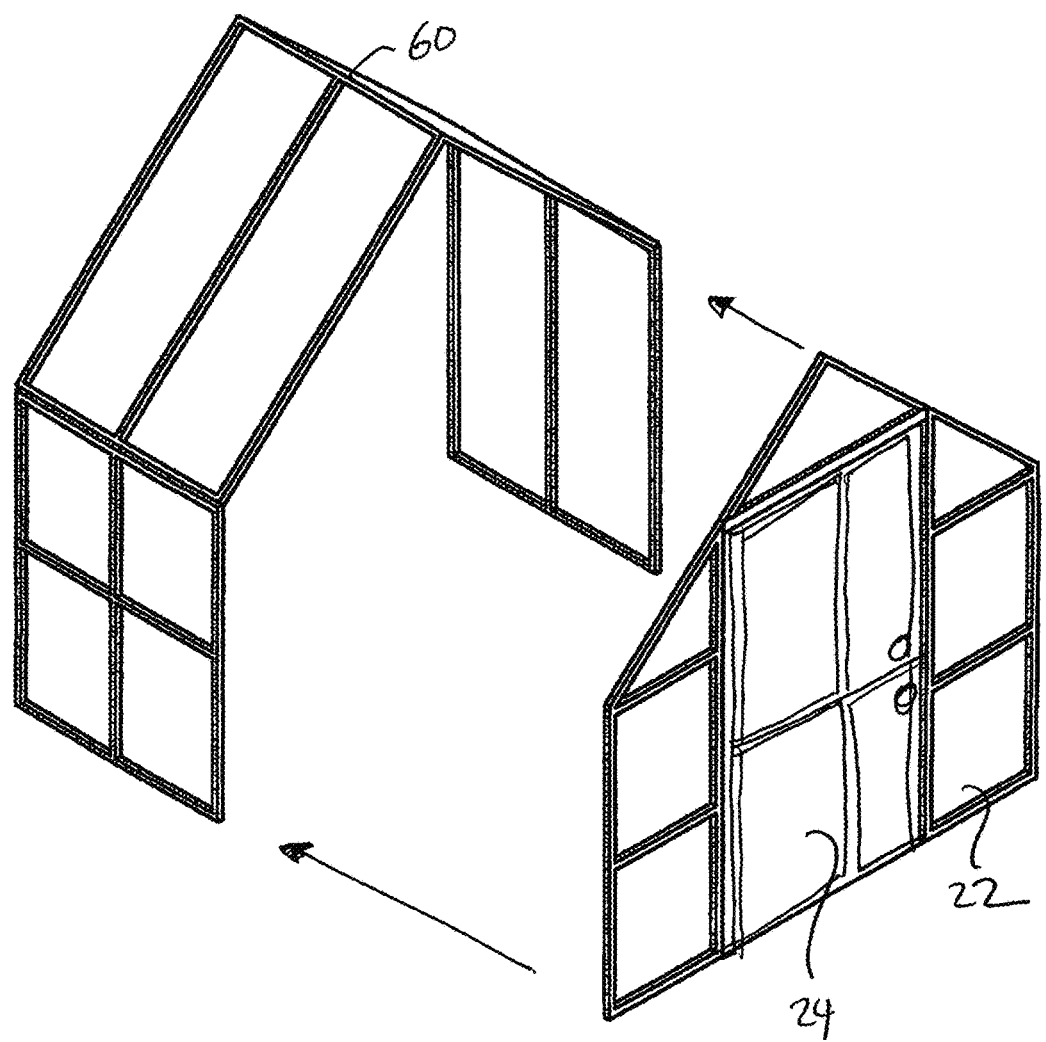
FIG. 38 substantially shows an assembled front end wall non-foldable panel being attached to a sidewall-to-roof-to-roof-to sidewall foldable panel combination.

As substantially shown in FIGS. 28 and 29, another embodiment of the roof panel 34 could be a dormer roof foldable panel 54 comprising of four triangularly-shaped dormer sections 56 hingedly connected together wherein the middle two dormer triangular sections 56 could fold to form the dormer while the each triangle section 56 outlying the dormer extends outward to form the dormer roof panels. The four hinged triangular sections 56 can be folded up against each other into a stacked collapsed state. When the dormer roof foldable panel 54 is integrated into the roof (e.g., generally replacing non-dormer roof panels of a sidewall-roof foldable panel combination via removal of the wire of piano hinges—not shown), the dormer roof foldable panel 54 as attached can accept truss brace section 72 of an end wall non-foldable end wall panel 22, 28 (as substantially shown in FIGS. 6 and 7) or otherwise allow an expansion of the modular greenhouse 20 to form a T-shaped modular greenhouse (as substantially shown in FIGS. 8, 9, 10 and 11.)

As substantially shown in FIGS. 30, 31, 32, 33, 34, 35, 36, 27 and 28, the non-foldable end walls panels, namely front end wall and a back end wall non-foldable panels 22, 28, could each frame out a doorway 26. The back end wall non-foldable panel 28 could have its doorway 26 sealed or enclosed by a non-openable door plug 30 while the front end wall non-foldable panel 22 could have a door 24 (e.g., split or Dutch door) movably attached to the respective formed doorway 26 to provide egress in and out of the assembled modular greenhouse 20. Each end wall non-foldable panel 22, 28 could be formed by a door 24 or door plug 30 along with three end wall sections connected to adjacent portions of the modular greenhouse 20 (e.g., side ends of the sidewall-roof combination.) Each end wall section could be formed a framework (tubing) that generally denotes an open space 44 generally enclosed by a suitable cover 46. These end wall sections could include a truss brace section 72 and two side sections 74 (one form could be used for both left and right side sections) oriented to accommodate the formed gable roof of the modular greenhouse 20 and to otherwise form the doorway 26. The truss brace section 72 could be at the top portion of the roof dormer above the two side sections 74 and form the top of the doorway 26. The two end sections 74 could be positioned at the sides of the non-foldable end wall panel 22, 28 to form the doorframe sides. For the front end wall non-foldable panel, a piano hinge (not shown) may be used to movably attach the door 24 to one of the two side sections 74. For the back end wall non-foldable panel 28, fasteners could secure the door plug 30 to all three end wall sections. In one manner of assemble, the truss brace section 72 and end sections 74 could be attached one at a time to the side ends of the sidewall-roof combination. The door 24 or door plug 30 could then be attached to the back end wall non-foldable panel 28 within the doorway 26 to complete the end wall non-foldable panel 22, 28. In another manner, the door 24/door plug 30, truss brace section 74, two side sections 74 could be assembled together on the ground to form the end wall non-foldable panel 22, 28 which could then be lifted and attached to the remainder of the modular greenhouse 20.

The back end wall foldable panel 28 (and other panels as well) could further comprise suitable bracing (not shown) as needed to provide further structural stability to the modular greenhouse. Such structural stability may be desired to enable the assemble modular greenhouse to withstand wear as caused by the elements; withstand wear as caused by axial and lateral loads during the transportation of the modular greenhouse 20 and to enable the customer to change the location of the greenhouse by sliding or lifting the modular greenhouse 20 to a new location.

The modular greenhouse 20 may further provide suitable means for ventilation (not shown.) In one embodiment, a portion of the cover of the foldable roof panel may unfastened from the respective the section framework and warped to create a ventilation opening form the outside environment directly into the modular greenhouse formed interior. Alternatively, a portion of the cover of the foldable sidewall panel may unfastened from the respective section framework and warped to create a ventilation opening form the outside environment directly into the modular greenhouse formed interior.

In yet another possible embodiment, exhaust fans (not shown) or exhaust vents (not shown) may be installed in one or more end wall nonfading panels (e.g., penetrating the truss brace section) of the assembled modular greenhouse. The exhaust fans and/or exhaust vents may also be installed on the sidewalls or roof folding panels. The activation of such exhaust fans may enables the flow of fresh air into the greenhouse and exhausts excessive heated inside air to the outside environment to generally control indoor temperatures.

The extendable greenhouse may include a portion of the roof that could be warped to substantially form an opening for ventilation. If the roof consists of multiple plastic sheets, then one of those plastic sheets may be unfastened and opened (inward or outward) for ventilation. The greenhouse may also include an exhaust fan installed on the back wall, or an exhaust vent installed on the front wall, with activation of the exhaust fan configured to ventilate the greenhouse.

At the greenhouse assembly site, the assembled modular greenhouse may be anchored in various ways (not show). In one embodiment, anchoring the modular greenhouse includes fastening one or more anchor augers (not shown) to the section framework located at the base of the modular greenhouse and driving the one or more anchor augers into the ground. The greenhouse may also be anchored by fitting rebar (not shown) through one or more holes formed within the base of the greenhouse and driving the rebar into the ground.

In using anchor augers (not shown) to secure the greenhouse, the anchor augers may be about 4 inches wide and about 36 inches deep with each anchor auger having the capacity to holding about 100 pounds. These anchor augers may be screwed into the ground or driven into the ground using various driving methods. The anchor augers may then be fastened to respective angle iron bases connected to respective section frameworks to secure the greenhouse to the ground, foundation or both. Differently sized anchor augers may be used depending on the type of soil and expected weather patterns at the delivery destination.

In using rebar to secure the greenhouse, the rebar (i.e., a reinforced bar) could be that steel bar as used as a tensioning device in reinforced concrete and reinforced masonry structures holding the secured material in compression. For securing the present invention rebar can be inserted through the holes of the angle iron base and then be driven into the ground proximate the greenhouse. The rebar can be inserted straight or at an angle. The rebars may also be screwed into the ground; hammered into the ground or driven into the ground using various securing methods. If necessary, additional holes may be formed on the angle iron base specifically for the rebars. In one possible embodiment, 4 foot rebar may be driven into the ground through suitable angle iron bases (e.g., as attached to respective a section framework). Alternative embodiments may use rebars of different lengths and widths, in addition to different numbers and arrangements of rebars around the angle iron base.

Figure 39:
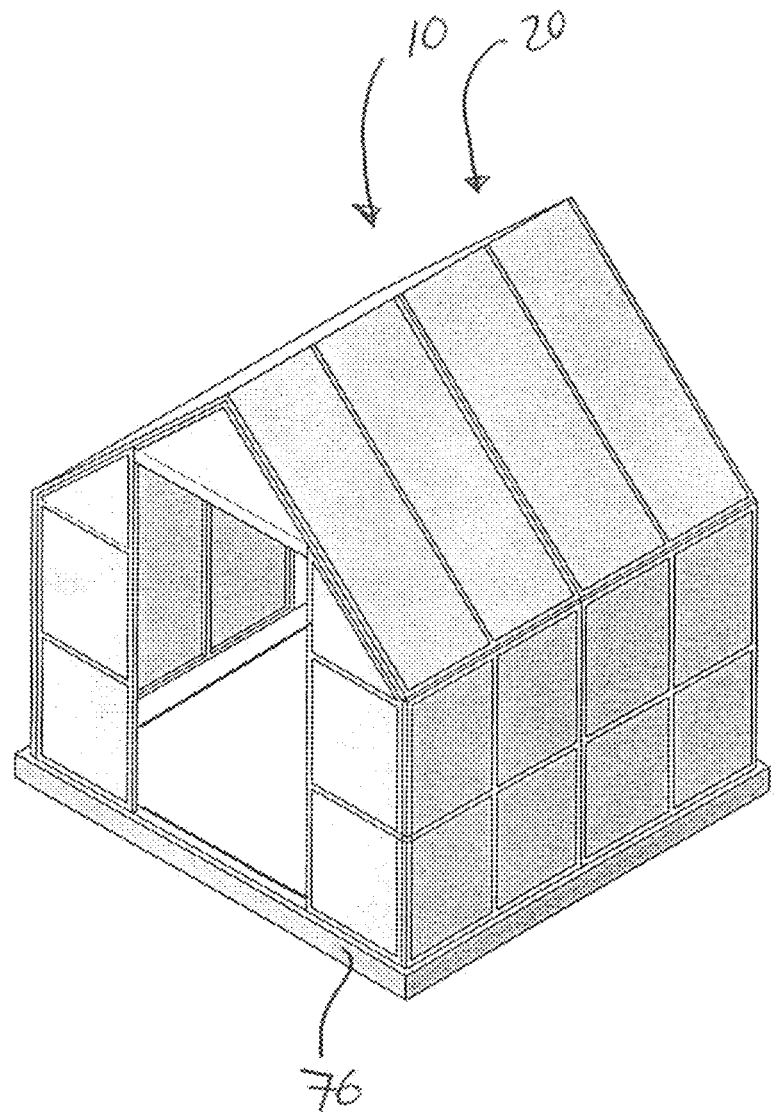
FIG. 39 is substantially showing an assembled modular greenhouse located upon a footing.

As substantially shown in FIG. 39, the modular greenhouse 20 may also be anchored by constructing a footing 76 at the assembly site 12 and positioning (e.g., and securing) the assembled modular greenhouse 20 onto the prepared footing 76. The footing 76 (e.g., cement, concrete, wood, etc.) for the modular greenhouse 20 may be constructed and the assembled modular greenhouse 20 could be applied and secured to the footing 76. The initial greenhouse kit, as an illustration, could use a footing 76 that is about 12 feet long and 8 feet wide may be used. Alternative dimensions for the footing 76 or the foundation may be constructed as needed depending on the dimensions and weight of the greenhouse; changes made to an assembled greenhouse as well as the soil conditions and expected weather patterns at the delivery destination.

Figure 40:
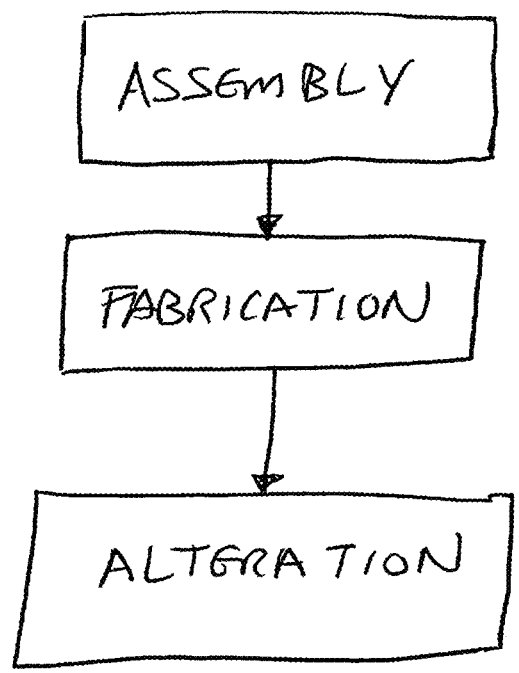
FIG. 40 substantially shows could be a schematic drawing for showing the steps of a method for assembling a prefabricated modular greenhouse.

As substantially shown in FIG. 40, an embodiment of the invention could be a process or method 200 for assembling a prefabricated modular greenhouse. The first step 202 could be the fabrication of the prefabricated modular greenhouse kit. This fabrication could include preparation of foldable panels and non-foldable panels made from sections comprising of frameworks to which are cover which generally cover open spaces formed by the section framework. Covers could be translucent plastic sheets, opaque plastic sheets, non-plastic non translucent covers (e.g., corrugated metal sheets.) Foldable panels as utilized in a particular kit can be respectively folded upon themselves into a compact state to allow sections of non-foldable panels to be stacked (e.g., horizontally) together. Non-folding panel sections can then be stacked upon the stacked folded non-folding panels. Hardware (panel connecting, section connecting, anchoring, etc.) could be bagged along with assembly instructions and placed upon the stacked panels and sections. The stacked assembly can then loaded in to a box container, which as needed, can be further secured to a pallet to facilitate transport and storage of the kit. In other versions, the greenhouse kit could be placed in several box containers that could be stack upon and be attached to the pallet.

It should be noted that a variety of different greenhouse kits could be assembled using different number and types of components to provide different sizes of greenhouses with differing architectural elements. In addition, the greenhouse kits could be assembled to be add-on greenhouse kits that generally do not provide a modular greenhouse per se but rather are used to add additional or different architectural details or increase the capacity or footprint of an assembled modular greenhouse. Once this step is substantially completed, the method could proceed to step 204, assembly of the modular greenhouse.

In step 204, assembly of the modular greenhouse, the desired greenhouse kit(s) could be delivered to the modular greenhouse assembly or construction site (e.g., delivery location.) The construction site could be plain ground or could be enhanced a suitable footing or foundation. At the delivery destination, the greenhouse kit(s) may be unloaded of their contents and the contents being suitably arranged to allow for ease of assembly and allow for reading of the provided assembly instructions. The foldable panels can be unfold and placed aside while non-foldable panels, depending on the embodiment (or operator desire), could be constructed from their respective sections (and door or door plug assemblies.)

At this time, depending on the particular kit, a first sidewall-to-roof-to-roof-to sidewall non-foldable panel combination could be lifted up and oriented into its proper form for modular greenhouse assembly. As that first combination is generally held in place, the appropriate wall non-foldable panel (if previously assembled) can lifted up and be removably attached to side end of the combination by appropriate means (e.g., clips or the like.) This could provide an initial stable structure so allow easier attachment of second properly oriented combination to be secured to the unattached side end of the first combination. A third combination could be attached to the unattached side end of the second combination. This attachment process being repeated until the desired length of the modular greenhouse achieved. The front end wall non-foldable panel (e.g., with door) can then be removably attached to the last fitted combination to generally complete the initial modular green house. During for after initial assembly, the greenhouse could be positioned upon, secured to or both, a footing or a foundation if so previously constructed.

Alternatively, the assembled modular greenhouse can be placed directly on the ground without a solid base to be used for ground planting when a solid base is not provided for floor of the greenhouse (e.g., the floor is generally a dirt floor rather than a construction material floor.) The greenhouse may also enable raised bed planting without having to use planter boxes, even though the use of planter boxes is also possible if desired. As this step is completed, the method could proceed to step 206, alteration of the modular greenhouse.

In step 206, alteration of the modular greenhouse, additional modular greenhouse kits could be obtained that provide additional modular greenhouse panels, pairs or combinations that can be used to change the original configuration of the modular greenhouse as assembled. One or more kit supplied additional sidewall-to-roof-to-roof-to sidewall non-foldable panel combinations can be added to increase the length of the assembled modular greenhouse or can be used with a roof dormer to create a room off the main portion of the modular greenhouse.

A roof dormer kit can be used to replace two sets of sidewall-roof pairs of two combinations (removing wires from connecting roof panel-to-roof panel piano hinges and relevant fasteners) to create an opening on a formed side wall to allow and attachment of an end wall non-foldable panel to the side wall. Alternatively a set of additional sidewall-to-roof-to-roof-to sidewall non-foldable panel combinations can be assembled together and be connected to the opening created by the roof dormer to form a new section of the assembled modular greenhouse. An additional end wall non-foldable panel could be used to seal the new sections. These additional panel kits can be used to increase the size of; alter or add architectural details (e.g., add a roof dormer) to; or otherwise modify the assembled modular greenhouse.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A modular greenhouse that is prefabricated at a first site remote from a second site where the modular greenhouse is subsequently assembled, comprising:
    (A) a plurality of sections, each section constructed from a framework, the framework further creating an open space within the framework, the open space being covered by a cover attached to the framework;
    (B) a first group of sections from the plurality of sections forming a plurality of foldable panels, one foldable panel from the plurality being movably connected to a second foldable panel from the plurality to form one foldable panel pair that allows the one foldable panel to fold down upon the second foldable panel in a collapsed storage state;
    (C) a second group of sections from the plurality of sections that are connected together to form at least one non-foldable panel;
    (D) the one foldable panel pair and the at least one non-foldable panel being removably connected to form an assembled modular greenhouse and to allow additional foldable panels, additional non-foldable panels or both to be added to the assembled modular greenhouse to subsequently change or add one or more architectural details of the assembled modular greenhouse;
    (E) a piano hinge that comprises two hinge ends configured to be directly and removably connected together by a wire removably traversing both hinge ends allowing the hinge ends to pivot about each other, one hinge end is further affixed only to the one foldable panel while the second hinge end is further affixed only to the second foldable panel, wherein wire removal from the one hinge end and the second hinge end provides a means for removal of the one folded panel from the second folded panel; and
    (F) a third group of sections comprising four triangularly-shaped sections hingedly connected together to form a foldable roof dormer panel, wherein in a collapsed state the four sections are stacked against one another, and in an non-collapsed state first and second outside sections are in plane with one another.

2. The modular greenhouse of claim 1, wherein the one foldable panel is a wall panel and the second foldable panel is a roof panel.

3. The modular greenhouse of claim 1, wherein the foldable panel combination allows the foldable panels of the foldable panel combination to stack against each other in a collapsed storage state.

4. The modular greenhouse of claim 1, wherein one foldable panel or the at least one non-foldable panels is removed from the assembled modular greenhouse to subsequently change one or more architectural details of the assembled modular greenhouse.

5. The modular greenhouse of claim 1, wherein at least one section of the plurality of sections has a cover that is not translucent.

6. The modular greenhouse of claim 1, wherein the at least one non-foldable panel prevents passage of light through the at least one non-foldable panel.

7. The modular greenhouse of claim 1, wherein the one non-foldable panel forms a doorway to which is located either a door or a door plug.

8. The modular greenhouse of claim 1, wherein the roof dormer panel is configured to attach to the non-foldable panel that forms a doorway to which is located either a door or a door plug, the doorway non-foldable panel as attached to roof dormer panel otherwise replaces several non-foldable panels creating a non-door based wall structure.

9. The modular greenhouse of claim 1, wherein the first and second outside sections of the roof dormer panel are configured to attach to one of the plurality of foldable panels.

10. The modular greenhouse of claim 1, wherein the assembled modular greenhouse is moved to and joined to a footing constructed at the second site.

11. The modular greenhouse of claim 1, wherein the modular greenhouse is fabricated in a kit form comprising a box container containing at least the foldable panel pair in a stacked, folded compact state, at least one non-foldable panel, instructions and connecting hardware.

12. A method of assembling a prefabricated modular greenhouse comprising the following steps:
(A) providing a prefabricated modular greenhouse, the prefabricated modular greenhouse comprising a plurality of sections, each section constructed from a framework, the framework further creating an open space within the framework that is covered by a cover attaching to the framework, a first group of sections from the plurality of sections forming a plurality of foldable panels, one foldable panel being movably connected to a second foldable panel to form a foldable panel pair that allows the one foldable panel to fold down upon the second foldable panel in a stacked collapsed storage state, a second group of sections comprising at least one non-foldable panel that can be removably connected with the foldable panel pair to assemble the modular greenhouse to allow additional non-foldable panels, additional foldable panels or both to be added to the assembled greenhouse to subsequently change or add one or more architectural details of the assembled greenhouse, a piano hinge that comprises two hinge ends configured to be directly and removably connected together by a wire removably traversing both hinge ends allowing the hinge ends to pivot about each other, one hinge end is further affixed only to the one foldable panel while the second hinge end is further affixed only to the second foldable panel, the wire is further configured to allow the wire's removal from the two hinge ends, and a third group of sections comprising four triangularly-shaped sections hingedly connected together to form a foldable roof dormer panel, wherein in a collapsed state the four sections are stacked against one another, and in an non-collapsed state first and second outside sections are in plane with one another, and first and second middle sections are out of plane with one another;
(B) unfolding the at least one foldable panel pair and the foldable roof dormer panel;
(C) removably connecting the at least one foldable panel pair and the at least one non-foldable panel;
(D) removably connecting the at least one foldable panel pair to a third foldable panel by inserting a wire through both a third hinge end attached only to the third foldable panel pair and to a fourth hinge end only attached to the at least one foldable panel;
(E) removably connecting the foldable roof dormer panel to the at least one foldable panel pair in a manner to form an assembled greenhouse.

13. The method of claim 12, further comprises a step of disconnecting and removing from the assemble modular greenhouse at least one foldable panel pair, at least one non-foldable panel or both to be replaced with an additional foldable panel, additional non-foldable panel or both to change between a roof structure and a dormer structure.

14. The method of claim 12, further comprises a step of removably connecting to the assembled prefabricated modular greenhouse an additional foldable panel, an additional non-foldable panel or both to the assembled modular greenhouse to change between a wall structure and a door structure.

15. The method of claim 12, further comprises a step of substituting from the assembled prefabricated modular greenhouse the foldable panel pair or the at least one non-foldable panel with an additional foldable panel or additional non-foldable panel to change between a wall structure and a non-wall structure of the assembled modular greenhouse as originally assembled.

16. The method of claim 12, further comprises a step of constructing a footing and subsequently positioning the assembled modular greenhouse upon the footing.

17. The method of claim 16, wherein the step of constructing a footing further comprises a step of securing the assembled greenhouse to a previously constructed footing.

18. The method of claim 12, wherein the providing prefabricated modular greenhouse further comprises the steps of folding the foldable panel pair; placing the folded foldable panel pair, the at least non-foldable panel, instructions, and connecting hardware into a box container that is subsequently transported to a building site where the prefabricated modular greenhouse is to be assembled.

19. The method of claim 12, wherein the foldable roof dormer panel removably connects to the at least one foldable panel pair in a manner to form a T-shaped modular greenhouse.

20. The method of claim 12, wherein the foldable roof dormer panel allows for expansion of the modular greenhouse in a different direction than the at least one foldable panel pair.

* * * * *